(12) United States Patent
Noguchi

(10) Patent No.: US 9,210,396 B2
(45) Date of Patent: Dec. 8, 2015

(54) STEREOSCOPIC IMAGE GENERATION APPARATUS AND STEREOSCOPIC IMAGE GENERATION METHOD

(71) Applicant: JVC KENWOOD CORPORATION, Yokohama-shi, Kanagawa (JP)

(72) Inventor: Hiroshi Noguchi, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 364 days.

(21) Appl. No.: 13/798,230

(22) Filed: Mar. 13, 2013

(65) Prior Publication Data

US 2013/0194385 A1 Aug. 1, 2013

Related U.S. Application Data

(63) Continuation of application No. PCT/JP2012/057717, filed on Mar. 26, 2012.

(30) Foreign Application Priority Data

Mar. 31, 2011 (JP) .................. 2011-077368
Sep. 29, 2011 (JP) .................. 2011-214072

(51) Int. Cl.
*H04N 13/00* (2006.01)
*H04N 13/02* (2006.01)

(52) U.S. Cl.
CPC ....... *H04N 13/0007* (2013.01); *H04N 13/0022* (2013.01); *H04N 13/026* (2013.01); *H04N 2013/0081* (2013.01)

(58) Field of Classification Search
CPC .......... H04N 13/0007; H04N 13/0022; H04N 13/026; H04N 2013/0081

USPC ........................................... 348/43
See application file for complete search history.

(56) References Cited

U.S. PATENT DOCUMENTS

| 6,163,337 | A  | * | 12/2000 | Azuma et al. ............... 348/43 |
| 7,417,664 | B2 | * | 8/2008  | Tomita ........................ 348/43 |
| 2009/0195643 | A1 |   | 8/2009  | Neuman |

FOREIGN PATENT DOCUMENTS

| JP | 11355808 A    | 12/1999 |
| JP | 2001-128195 A | 5/2001  |
| JP | 2003-16427 A  | 1/2003  |

(Continued)

OTHER PUBLICATIONS

Official Action dated Apr. 14, 2015 in the counterpart Japanese application 2011-214072.
Tam, Wa James, et al., "Three-Dimensional TV: A Novel Method for Generating Surrogate Depth Maps Using Colour Information", Proceeding of SPIE-IS&T Electronic Imaging, vol. 7237, 2009, pp. 1-9.

(Continued)

*Primary Examiner* — Allen Wong
(74) *Attorney, Agent, or Firm* — Nath, Goldberg & Meyer; Jerald L. Meyer

(57) ABSTRACT

A 3D parallax value detection unit detects a parallax value between a left-eye image signal and a right-eye image signal in a stereoscopic video signal. A stereoscopic degree determination unit determines a stereoscopic degree of the stereoscopic video signal based on the parallax value. In response to the stereoscopic degree, an image signal conversion unit obtains an amount of pixel shift, by which a pixel of the left-eye image signal or the right-eye image signal is to be shifted, and shifts the pixel by the amount of pixel shift. In such a way, a parallax of the left-eye image signal or the right-eye image signal is adjusted.

13 Claims, 22 Drawing Sheets

(56) References Cited

FOREIGN PATENT DOCUMENTS

| | | |
|---|---|---|
| JP | 2003185967 A | 7/2003 |
| JP | 2004104425 A | 4/2004 |
| JP | 2004200973 A | 7/2004 |
| JP | 2005-26756 A | 1/2005 |
| JP | 2005026800 A | 1/2005 |
| JP | 2005167310 A | 6/2005 |
| JP | 4214529 A | 11/2008 |
| JP | 2010-45584 A | 2/2010 |

OTHER PUBLICATIONS

European Patent Application No. 12765976.1, Extended European Search Report dated Jun. 6, 2014, eight (8) pages.

Japanese Patent Application No. 2011-077368, Office Action No. Sep. 24, 2014, two (2) pages.

Official Action issued on Jun. 2, 2015 corresponding to Japanese application No. 2011-077368.

* cited by examiner

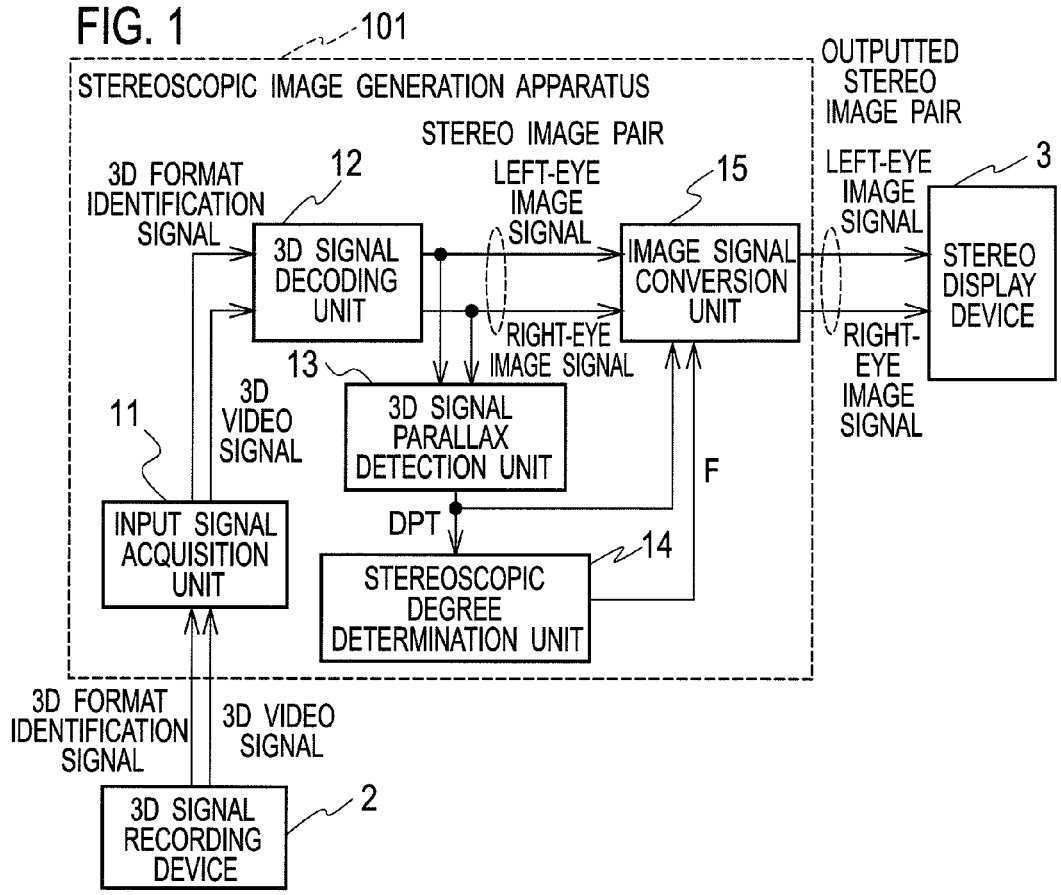
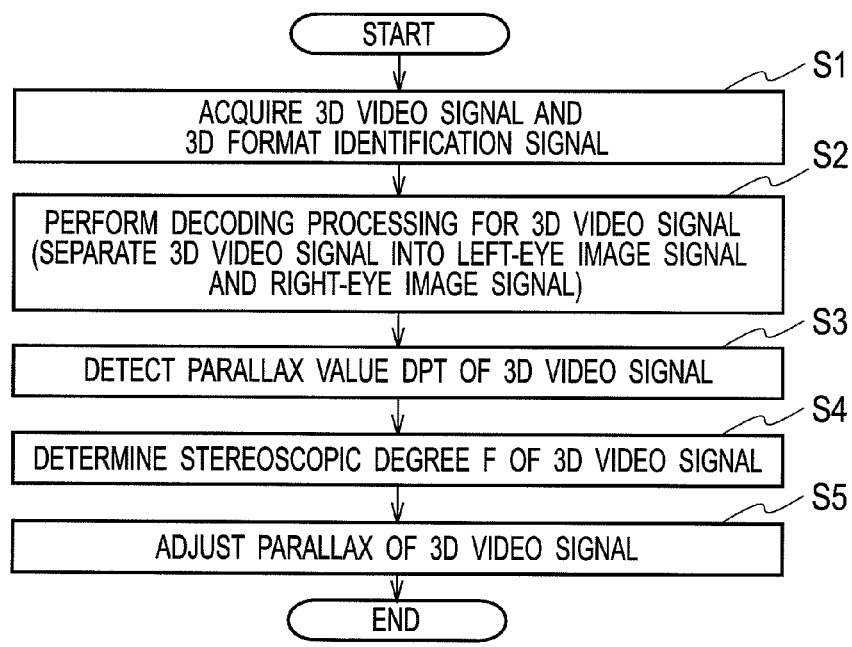

(PARALLAX 0) OB2
(PARALLAX -20) OB3
LEFT-EYE IMAGE
OB1 (PARALLAX 20)

OB2  OB3
OB1  LEFT-EYE IMAGE

Rocc  OB3
OB1  LEFT-EYE IMAGE  OB2

(PARALLAX 0) OB2
(PARALLAX -20) OB3
RIGHT-EYE IMAGE
OB1 (PARALLAX 20)

OB2  Rocc  OB3
OB1  RIGHT-EYE IMAGE

OB2  Rocc  OB3
OB1  RIGHT-EYE IMAGE

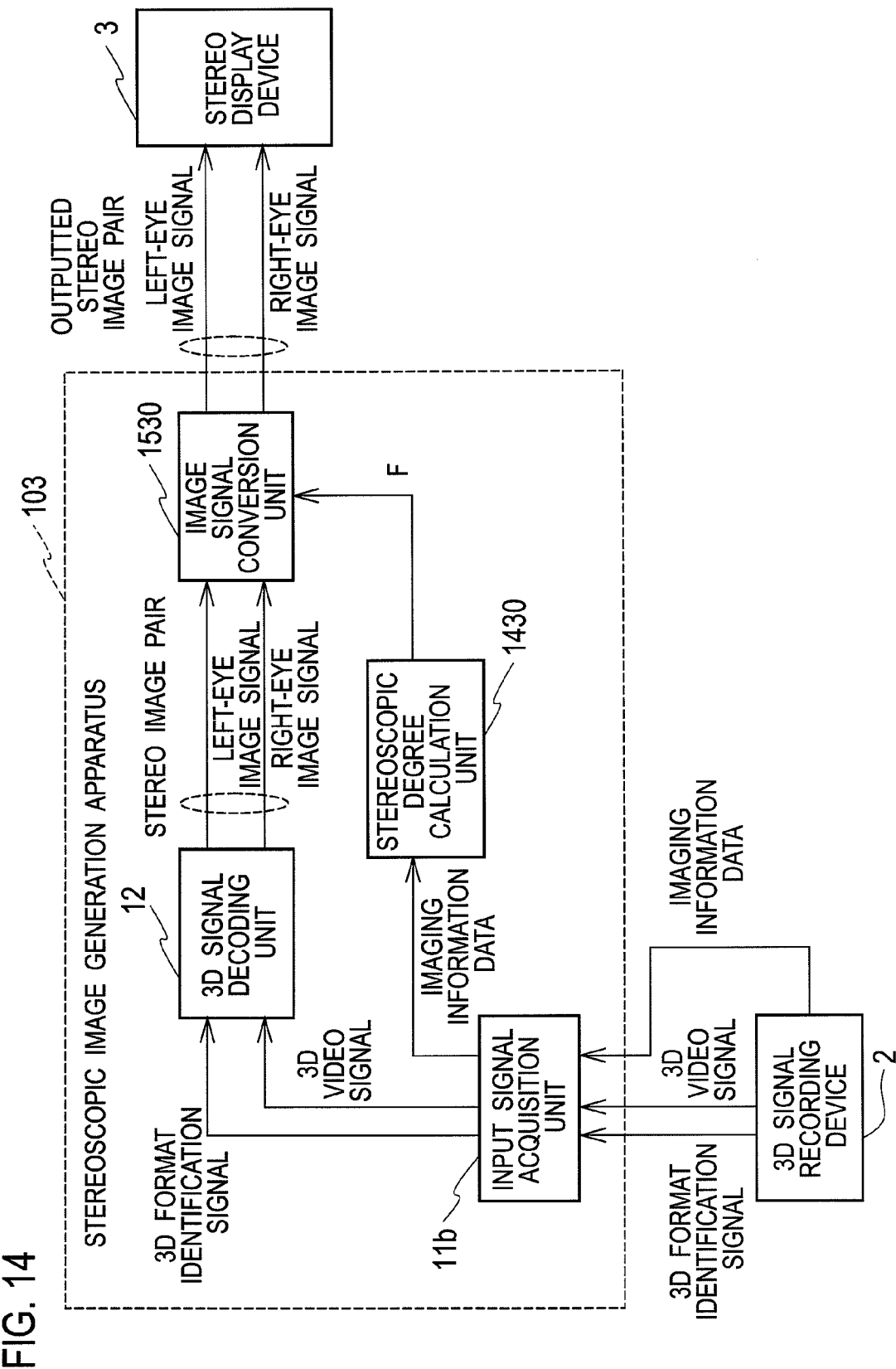

LEFT-EYE IMAGE

LEFT-EYE IMAGE

RIGHT-EYE IMAGE

RIGHT-EYE IMAGE

STEREOSCOPIC IMAGE GENERATION APPARATUS AND STEREOSCOPIC IMAGE GENERATION METHOD

CROSS REFERENCE TO RELATED APPLICATION

This application is a Continuation of PCT Application No. PCT/JP2012/057717, filed on Mar. 26, 2012, and claims the priority of Japanese Patent Application No. 2011-077368, filed on Mar. 31, 2011 and No. 2011-214072, filed on Sep. 29, 2011, the entire contents of all of which are incorporated herein by reference.

BACKGROUND

The embodiments relate to a stereoscopic image generation apparatus and a stereoscopic image generation method, which generate a stereoscopic image.

In recent years, a 3D image display device capable of displaying a stereoscopic image (3D image) has begun to become widespread. Also in television broadcast, broadcast by a 3D video signal is performed, and a 3D signal recording device capable of recording and reproducing the 3D video signal has also begun to become widespread. In usual, 3D video signal contents (hereinafter, referred to as 3D contents) for the broadcast and package media are a two-view video signal imaged by a twin-lens camera. In accordance with the two-view video signal, a real 3D image can be expressed.

SUMMARY

However, in the case of displaying, for example, a scene image (distant view image) by the two-view video signal, there has been a problem that a stereoscopic vision cannot be obtained so much. This problem occurs not only in the two-view video signal but also in a multi-view video signal, which is a three-view video signal or more, in a similar way.

In consideration of the problem as described above, it is an object of the embodiments to provide a stereoscopic image generation apparatus and a stereoscopic image generation method, which are capable of generating a stereoscopic image with a stereoscopic vision, even in accordance with a 3D video signal poor in stereoscopic vision.

In order to solve the above-mentioned problem in the conventional technology, in accordance with a first aspect of the embodiments, there is provided a stereoscopic image generation apparatus comprising: a parallax value detection unit configured to detect a parallax value between a left-eye image signal and a right-eye image signal in a stereoscopic video signal; a stereoscopic degree determination unit configured to determine a stereoscopic degree of the stereoscopic video signal based on the parallax value detected by the parallax value detection unit; and an image signal conversion unit configured to, in response to the stereoscopic degree, obtain an amount of pixel shift, by which a pixel of at least one signal of the left-eye image signal and the right-eye image signal is to be shifted, and shifts the pixel of the left-eye image signal.

In accordance with a second aspect of the embodiments, there is provided a stereoscopic image generation apparatus comprising: a stereoscopic degree determination unit configured to determine a stereoscopic degree of a stereoscopic video signal based on imaging information of a left-eye image signal and a right-eye image signal in the stereoscopic video signal; and an image signal conversion unit configured to, in response to the stereoscopic degree, obtain an amount of pixel shift, by which a pixel of at least one signal of the left-eye image signal and the right-eye image signal is to be shifted, and shifts the pixel of the left-eye image signal or the right-eye image signal by the amount of pixel shift.

In accordance with a third aspect of the embodiments, there is provided a stereoscopic image generation method comprising: a parallax value detection step of detecting a parallax value between a left-eye image signal and a right-eye image signal in a stereoscopic video signal; a stereoscopic degree determination step of determining a stereoscopic degree of the stereoscopic video signal based on the parallax value detected in the parallax value detection step; an amount-of-pixel-shift generation step of obtaining, in response to the stereoscopic degree, an amount of pixel shift, by which a pixel of at least one signal of the left-eye image signal and the right-eye image signal is to be shifted; and an image signal conversion step of shifting the pixel of the left-eye image signal or the right-eye image signal by the amount of pixel shift, the amount being generated in the amount-of-pixel-shift generation step.

BRIEF DESCRIPTION OF THE DRAWINGS

FIG. 1 is a block diagram showing a first embodiment of a stereoscopic image generation apparatus.

FIG. 2 is a flowchart for explaining operations of the first embodiment shown in FIG. 1.

FIG. 14 is a block diagram showing a third embodiment of the stereoscopic image generation apparatus.

DETAILED DESCRIPTION

First Embodiment

Figure 3:
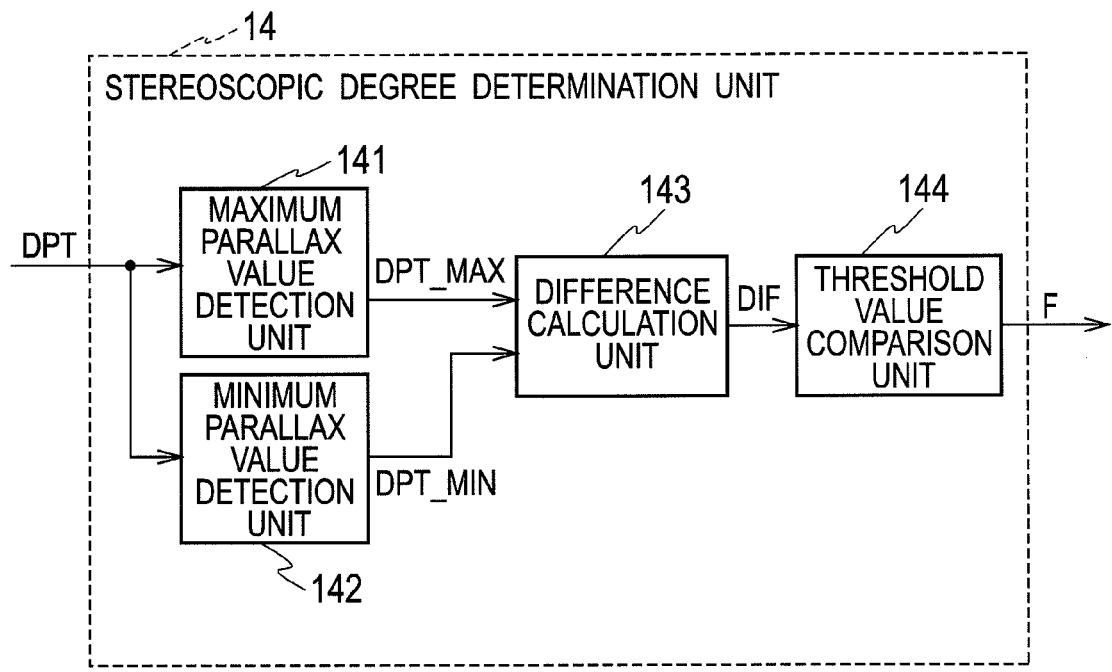
FIG. 3 is a block diagram showing a specific configuration of a stereoscopic degree determination unit 14 in FIG. 1.

In FIG. 1, to a stereoscopic image generation apparatus 101, a 3D signal recording device 2 and a stereo display device 3 are connected. The stereoscopic image generation apparatus 101 includes an input signal acquisition unit 11, a 3D signal decoding unit 12, a 3D signal parallax detection unit 13, a stereoscopic degree determination unit 14, and an image signal conversion unit 15. A stereoscopic extent is referred to as a stereoscopic degree.

While referring to a flowchart of FIG. 2, a description is made of operations of the respective units of the stereoscopic image generation apparatus 101. The input signal acquisition unit 11 acquires a 3D video signal and a 3D format identification signal, which are outputted from the 3D signal recording device 2 as a 3D video signal transmission source (Step S1). For example, the input signal acquisition unit 11 is a portion including an input terminal and an input interface. The 3D format identification signal is a signal indicating to which of a side/by/side mode, a top/and/bottom mode, a line/by/line mode, a field sequential mode and the like a format of 3D contents belongs.

Transmission/reception of a 3D signal is standardized by HDMI 1.4a, and in this embodiment, the input signal acquisition unit 11 acquires the 3D video signal and the 3D format identification signal from the 3D signal recording device 2 based on the standard of HDMI 1.4a. The 3D video signal and the 3D format identification signal, which are acquired by the input signal acquisition unit 11, are supplied to the 3D signal decoding unit 12.

Based on the 3D format identification signal, the 3D signal decoding unit 12 separates the 3D video signal into a left-eye image signal and a right-eye image signal (Step S2). The left-eye image signal and the right-eye image signal are supplied to the 3D signal parallax detection unit 13 and the image signal conversion unit 15. The left-eye image signal and the right-eye image signal compose a stereo image pair.

For example, by using a stereo matching method as a representative example of a parallax calculation method, the 3D signal parallax detection unit 13 detects a 3D signal parallax value DPT between the left-eye image signal and right-eye image signal of the stereo image pair in a unit of one pixel while taking the left-eye image signal (or the right-eye image signal) as a reference (Step S3). The stereo matching method is a method in which, with regard to pixel blocks present in one imaged image (reference image), that is, pixel groups for each of small regions which compose a part of the reference image, a correlation destination thereof is specified in other imaged image (comparison image), whereby the parallax value is obtained for each of the pixel blocks in the imaged image (reference image) (refer to Japanese Patent No. 4214529). Hereinafter, Japanese Patent No. 4214529 is referred to as Patent Literature 1. In the case where a value of the 3D signal parallax value DPT is positive, a parallax is defined to be in a protruding direction, and in the case where the value concerned is negative, the parallax is defined to be in a depth direction (retreating direction).

The 3D signal parallax value DPT is supplied to the stereoscopic degree determination unit 14. The stereoscopic degree determination unit 14 determines the stereoscopic degree F. of the 3D video signal based on the inputted 3D signal parallax value DPT (Step S4).

By using FIG. 3, a description is made of a specific configuration and operations of the stereoscopic degree determination unit 14. As shown in FIG. 3, the stereoscopic degree determination unit 14 includes a maximum parallax value detection unit 141, a minimum parallax value detection unit 142, a difference calculation unit 143, and a threshold value comparison unit 144. The maximum parallax value detection unit 141 calculates a maximum value in one frame period of the 3D signal parallax value DPT as a maximum 3D signal parallax value DPT_MAX. The minimum parallax value detection unit 142 calculates a minimum value in one frame period of the 3D signal parallax value DPT as a minimum 3D signal parallax value DPT_MIN. In this embodiment, the parallax direction in the case where the value of the 3D signal parallax value DPT is positive is defined to be the protruding direction, and the parallax direction in the case where the value of the 3D signal parallax value DPT is negative is defined to be the retreating direction. Accordingly, the maximum 3D signal parallax value DPT_MAX becomes a parallax value of an object located on a most front side in a stereo image, and the minimum 3D signal parallax value DPT_MIN becomes a parallax value of an object located on a most depth side in the stereo image.

The difference calculation unit 143 calculates a 3D parallax difference value DIF, which is a difference between the maximum 3D signal parallax value DPT_MAX and the minimum 3D signal parallax value DPT_MIN, based on Expression (1). The 3D parallax difference value DIF always becomes a positive value.

$$DIF=DPT\_MAX-DPT\_MIN \quad (1)$$

Figure 4:
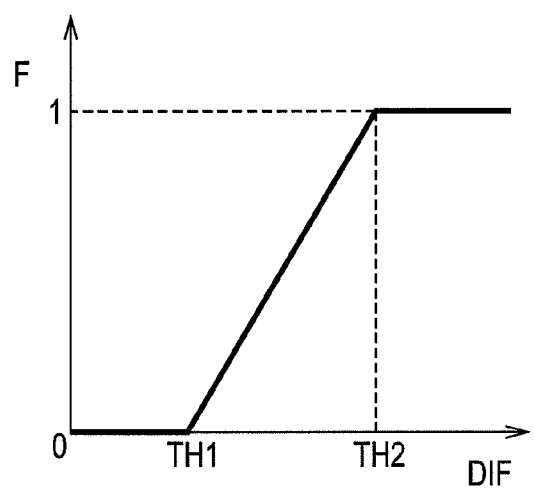
FIG. 4 is a characteristic diagram of a stereoscopic degree F. to be generated by the stereoscopic degree determination unit 14 in FIG. 1.

As shown in FIG. 4, the threshold value comparison unit 144 compares the 3D parallax difference value DIF and threshold values TH1 and TH2 with each other, and outputs the stereoscopic degree F. Values of the threshold values TH1 and TH2 just need to be set as appropriate. If the 3D parallax difference value DIF is smaller than the threshold value TH1, then a value of the stereoscopic degree F. becomes zero, and if the 3D parallax difference value DIF is larger than the threshold value TH2, then the value of the stereoscopic degree becomes one. If the 3D parallax difference value DIF is between the threshold value TH1 and the threshold value TH2, then the 3D parallax difference value DIF becomes a value that is increased linearly from zero to one. It is indicated that a back-and-forth relationship between the objects is clearer as such a parallax value difference between the objects in the stereo image is becoming larger, and the stereoscopic degree F. becomes large. The stereoscopic degree F. is supplied to the image signal conversion unit 15 of FIG. 1.

Returning to FIG. 1 and FIG. 2, the image signal conversion unit 15 shifts a pixel of at least one signal of the left-eye image signal and the right-eye image signal, which are the stereo image pair outputted from the 3D signal decoding unit 12, and adjusts and outputs the parallax (Step S5). The image signal conversion unit 15 can be realized, for example, by applying a pseudo stereoscopic image generation apparatus as described in Patent Literature 1. The pseudo stereoscopic image generation apparatus as described in Patent Literature 1 is called a so-called 2D3D conversion apparatus, and is an apparatus that generates a pseudo stereoscopic image from a 2D image.

Figure 5:
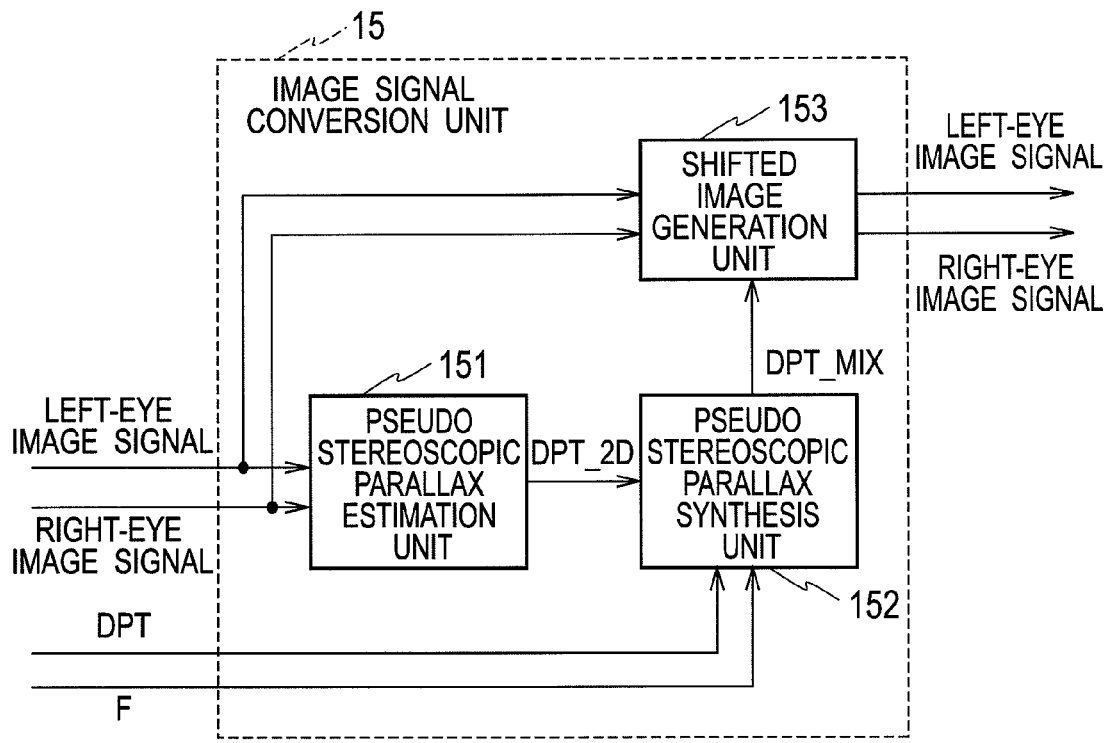
FIG. 5 is a block diagram showing a specific configuration of an image signal conversion unit 15 in FIG. 1.

By using FIG. 5, a description is made of a specific configuration and operations of the image signal conversion unit 15. As shown in FIG. 5, the image signal conversion unit 15 includes a pseudo stereoscopic parallax estimation unit 151, a pseudo stereoscopic parallax synthesis unit 152, and a shifted image generation unit 153. While taking, as a reference, either image signal of the left-eye image signal and the right-eye image signal, which are the inputted stereo image pair, the pseudo stereoscopic parallax estimation unit 151 calculates a pseudo stereoscopic parallax value DPT_2D. As the image for use in the calculation, the image signal is used, which is taken as a reference in the event where the 3D signal parallax detection unit 13 calculates the 3D signal parallax value DPT. As a calculation method of the pseudo stereoscopic parallax value DPT_2D, a method known in public just needs to be used, and for example, may be a method of calculating the pseudo stereoscopic parallax value described in Patent Literature 1.

By using the 3D signal parallax value DPT, the pseudo stereoscopic parallax value DPT_2D and a pseudo stereoscopic parallax value adjustment gain G, the pseudo stereoscopic parallax synthesis unit 152 calculates a synthetic parallax value DPT_MIX based on Expression (2). The synthetic parallax value DPT_MIX is a parallax value for generating an image signal, which has a parallax, from such a reference image signal. The synthetic parallax value DPT_MIX takes positive and negative values, represents that the current parallax is a parallax in the protruding direction when the synthetic parallax value DPT_MIX is a positive value, and represents that the current parallax is a parallax in the depth direction when the synthetic parallax value DPT_MIX is a negative value.

$$DPT\_MIX = DPT + DPT\_2D \times G \qquad (2)$$

Figure 6:
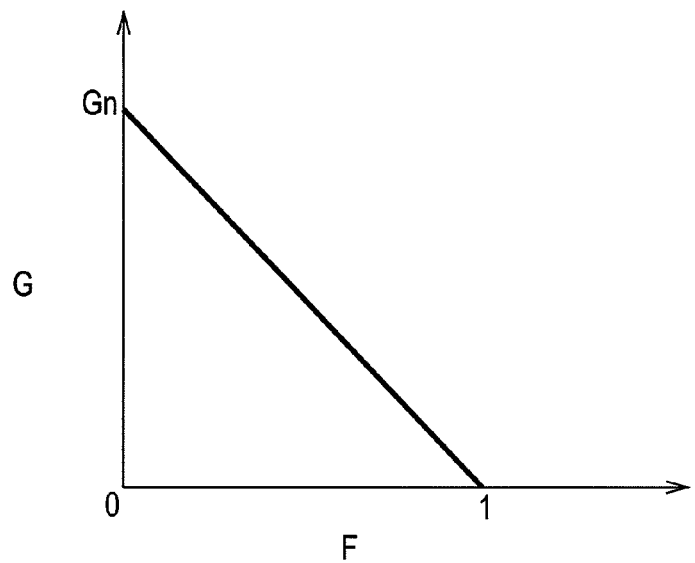
FIG. 6 is a characteristic diagram of a pseudo stereoscopic parallax value adjustment gain for use in the image signal conversion unit 15 in FIG. 1.

As shown in FIG. 6, the pseudo stereoscopic parallax synthesis unit 152 decides the pseudo stereoscopic parallax value adjustment gain G from the stereoscopic value F. In the case where the stereoscopic degree is one, the pseudo stereoscopic parallax value adjustment gain G becomes zero, and in the case where the stereoscopic degree F. is zero, the pseudo stereoscopic parallax value adjustment gain G becomes Gn. In the case where the stereoscopic degree F. is one, that is, the stereoscopic F is highest, since the pseudo stereoscopic parallax value adjustment gain G is zero, the pseudo stereoscopic parallax value DPT_2D also becomes zero, and the synthetic parallax value DPT_MIX becomes the 3D signal parallax value DPT as a parallax value in the inputted stereo image pair. As the stereoscopic degree F. is being decreased from one to zero, the pseudo stereoscopic parallax value adjustment gain G is increased from zero to Gn, and accordingly, a value of the pseudo stereoscopic parallax value DPT_2D in the synthetic parallax value DPT_MIX is increased. As the stereoscopic degree F. is becoming smaller, the pseudo stereoscopic parallax value adjustment gain G becomes larger, and a ratio of the pseudo stereoscopic parallax value DPT_2D in the synthetic parallax value DPT_MIX becomes larger.

The shifted image generation unit 153 shifts the pixel of one image signal in the inputted stereo image pair based on the synthetic parallax value DPT_MIX outputted from the pseudo stereoscopic parallax synthesis unit 152, and thereby generates the other image signal in the inputted stereo image pair. In this embodiment, the 3D signal parallax value DPT and the pseudo stereoscopic parallax value DPT_2D are calculated while taking the left-eye image signal as the reference image signal, and accordingly, the pixel of the left-eye image signal inputted to the shifted image generation unit 153 is shifted based on the synthetic parallax value DPT_MIX, whereby the right-eye image signal is generated. Such pixel shift refers to that a position of the pixel is moved. A specific method of shifted image generation processing is described in Patent Literature 1.

Figure 7:
FIG. 7 is a view showing an example of a distant view image.
Figure 8:
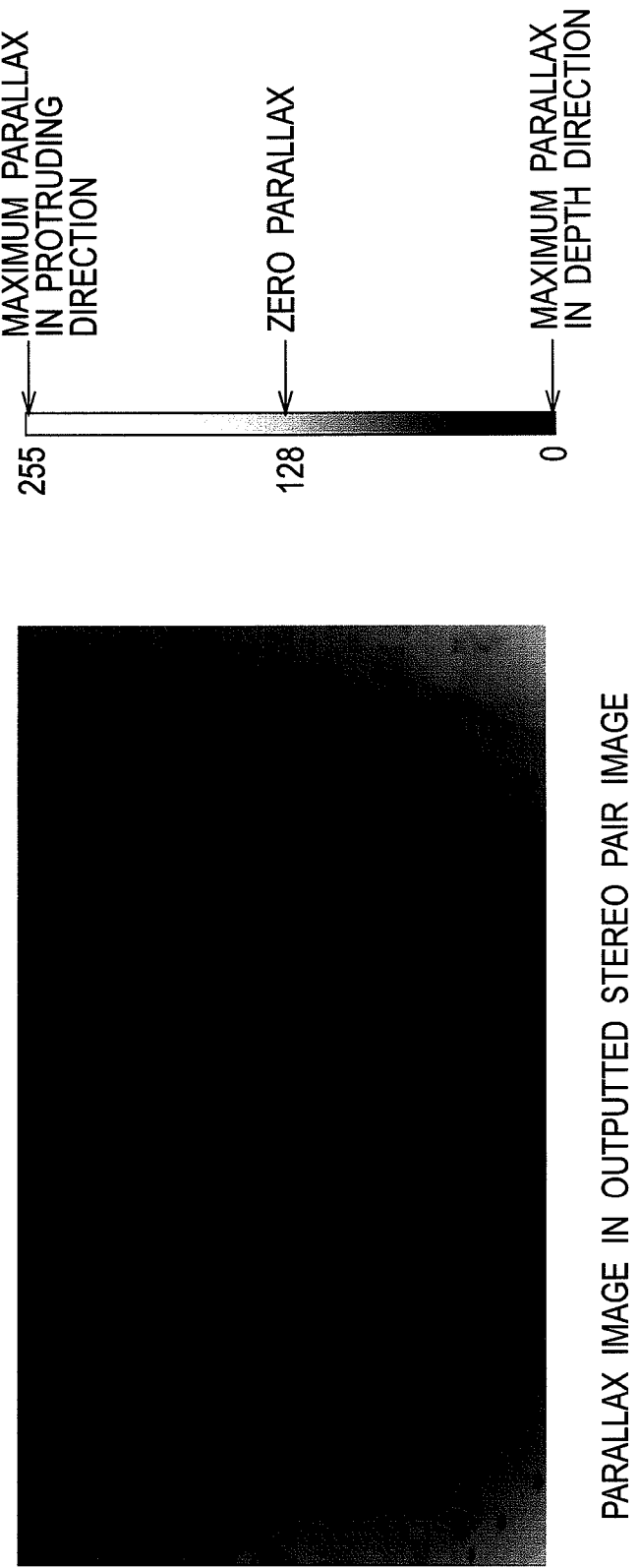
FIG. 8 is a view for explaining effects according to the first embodiment.

A description is made of effects of this embodiment. In the case of having imaged such a distant view image as shown in FIG. 7, since the parallax difference between the stereo image pairs is small, the 3D parallax difference value DIF to be obtained by the stereoscopic degree determination unit 14 is small, and the stereoscopic degree F. is also small. When the synthetic parallax value DPT_MIX is added to the stereo image pairs in the image signal conversion unit 15, an image with a more stereoscopic vision as shown in FIG. 8 can be outputted. In FIG. 8, a value in the case where the parallax is zero is set at 128, a value in the case where the maximum parallax taken in the depth direction is set at zero, and a value in the case where the maximum parallax is taken in the front direction is set at 255, whereby the parallax is expressed by a gray scale that ranges from zero to 255.

In the stereoscopic image generation apparatus 101 in the first embodiment, the stereoscopic degree F. of the inputted stereo image pair is determined, and an amount of such pixel shift is adjusted based on the stereoscopic degree F., whereby the image in which the stereoscopic vision is improved is generated. Based on the stereoscopic degree F., the image signal conversion unit 15 obtains the amount of pixel shift, by which the pixel of at least one monocular video signal of the left-eye image signal and the right-eye image signal is to be shifted, and generates a shifted video signal shifted based on the amount of pixel shift. The stereoscopic degree F. is calculated based on the 3D signal parallax value DPT obtained in the 3D signal parallax detection unit 13. The image signal conversion unit 15 includes the pseudo stereoscopic value estimation unit 151 that calculates the pseudo stereoscopic parallax value DPT_2D from the monocular video signal, and calculates the amount of pixel shift based on the stereoscopic degree F., the pseudo stereoscopic parallax value DPT_D and the signal parallax value DPT. In such a way, even in the case where a 3D stereo image pair poor in stereoscopic vision, such as a distant view image, is inputted, the image with the stereoscopic vision can be generated.

Second Embodiment

Figure 9:
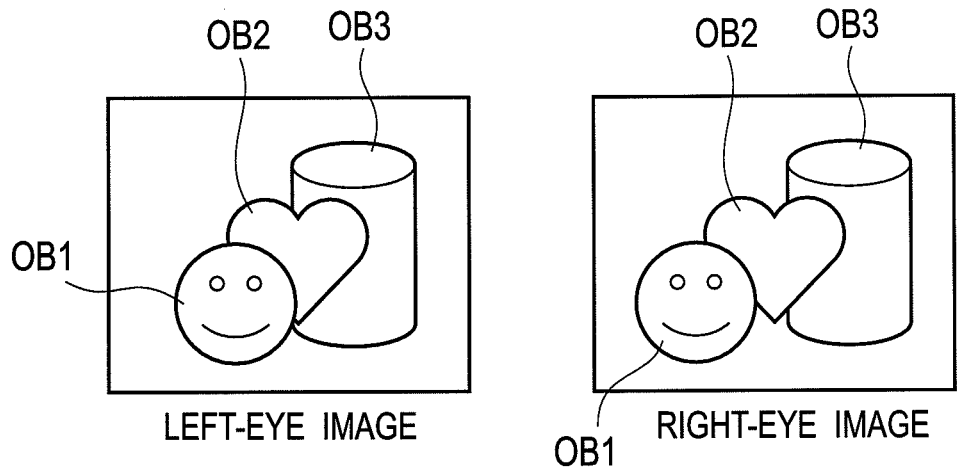
FIG. 9 is a view showing an example of a stereo image pair.
Figure 10:
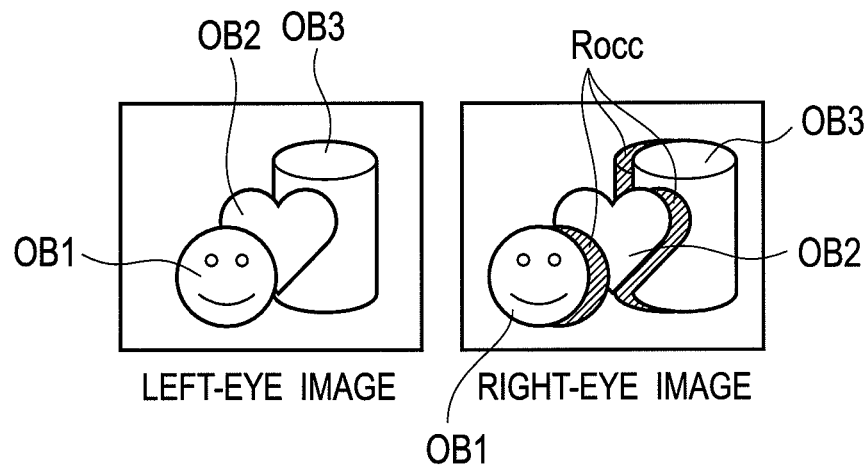
FIG. 10 is a view showing a 3D stereo image pair to be outputted by the image signal conversion unit 15 in FIG. 1.

FIG. 9 shows an example of the inputted stereo image pair. In FIG. 9, an object OB1 has a parallax in the protruding direction, an object OB2 has no parallax, and an object OB3 has a parallax in the depth direction. In the case where the 3D stereo image pair of FIG. 9 is inputted to the stereoscopic image generation apparatus 101 of the first embodiment, and the image signal conversion unit 15 generates a shifted image signal while setting the pseudo stereoscopic parallax value adjustment gain G at zero, the image signal conversion unit 15 outputs a 3D stereo image pair shown in FIG. 10. A left-eye image signal shown in FIG. 10 is an inputted image signal, and a right-eye image signal is a signal generated by performing the pixel shift for the left-eye image signal.

Shaded regions shown in the right-eye image are occlusion regions Rocc which have occurred by shifting the pixels, and pixels which must be present in the inputted right-eye image signal are not present therein. In the occlusion regions Rocc, pixel data are generated by performing pixel interpolation for shifted pixel data on a peripheral portion thereof, which it has been possible to normally generate, and accordingly, it sometimes becomes difficult to reproduce the inputted image signal. The second embodiment improves this point.

Figure 11:
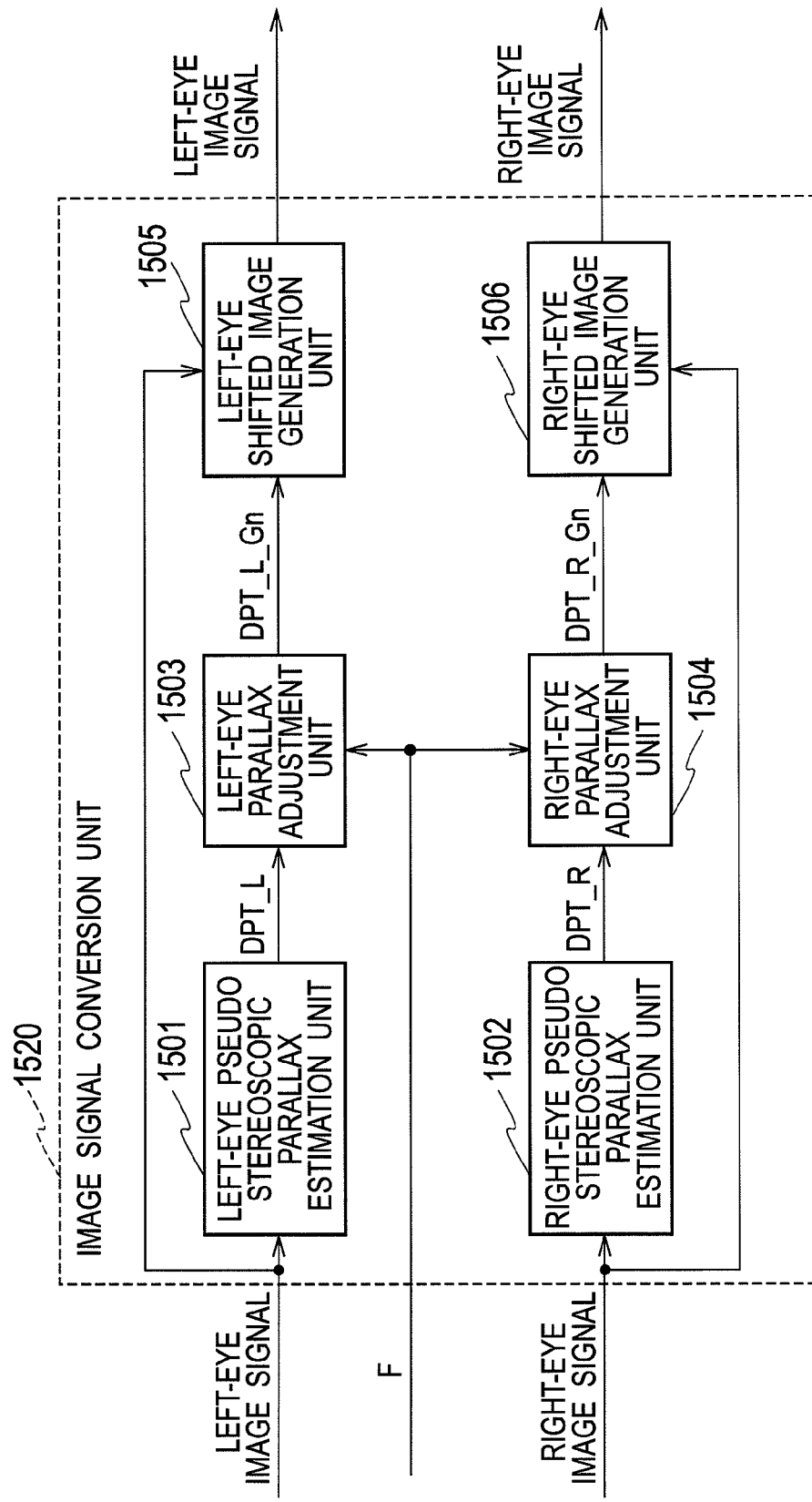
FIG. 11 is a block diagram showing a specific configuration of an image signal conversion unit 1520 in a second embodiment of the stereoscopic image generation apparatus.

In the second embodiment, an image signal conversion unit 1520 shown in FIG. 11 is used in place of the image signal conversion unit 15. The image signal conversion unit 1520 includes a left-eye pseudo stereoscopic parallax estimation unit 1501, a right-eye pseudo stereoscopic parallax estimation unit 1502, a left-eye parallax adjustment unit 1503, a right-eye parallax adjustment unit 1504, a left-eye shifted image generation unit 1505, a right-eye shifted image generation unit 1506. The left-eye pseudo stereoscopic parallax estimation unit 1501 detects a left-eye pseudo stereoscopic parallax value DPT_L from the left-eye image signal based on a pseudo stereoscopic parallax generation method as described in Japanese Patent laid-Open Publication No. 2003-16427. Based on Expression (3), the left-eye parallax adjustment unit 1503 performs gain adjustment for the left-eye pseudo stereoscopic parallax value DPT_L detected by the left-eye pseudo stereoscopic parallax estimation unit 1501. Reference symbol G of Expression (3) denotes the pseudo stereoscopic parallax value adjustment gain G shown in FIG. 6 in a similar way to Expression (2).

$$DPT\_L\_Gn = DPT\_L \times G \quad (3)$$

An already-adjusted left-eye pseudo stereoscopic parallax value DPT_L_Gn outputted from the left-eye parallax adjustment unit 1503 is inputted to the left-eye shifted image generation unit 1505. The already-adjusted left-eye pseudo stereoscopic parallax value DPT_L_Gn takes positive and negative values, represents that the current parallax is a parallax in the protruding direction when the already-adjusted left-eye pseudo stereoscopic parallax value DPT_L_Gn is a positive value, and represents that the current parallax is a parallax in the depth direction when the already-adjusted left-eye pseudo stereoscopic parallax value DPT_L_Gn is a negative value. The left-eye shifted image generation unit 1505 shifts the inputted left-eye image signal by the number of pixels, which is based on the already-adjusted left-eye pseudo stereoscopic parallax value DPT_L_Gn, and generates a left-eye image signal (left-eye shifted image signal) in which the parallax is adjusted.

In this embodiment, when the left-eye pseudo stereoscopic parallax value DPT_L is a positive value, a parallax-adjusted left-eye image signal in which the inputted left-eye image signal is shifted in a right direction by the number of pixels, which is based on the value concerned, is generated, and when the left-eye pseudo stereoscopic parallax value DPT_L is a negative value, a parallax-adjusted left-eye image signal in which the inputted left-eye image signal is shifted in a left direction by the number of pixels, which is based on the value concerned, is generated. In the case where the pseudo stereoscopic parallax value adjustment gain G is zero, the already-adjusted left-eye pseudo stereoscopic parallax value DPT_L_Gn becomes zero, and the inputted left-eye image signal is outputted. In this embodiment, a half value of the already-adjusted left-eye pseudo stereoscopic parallax value DPT_L_Gn obtained by the left-eye parallax adjustment unit 1503 is defined as the number of shifted pixels. However, the value of the number of shifted pixels is not limited to this.

Figure 12A:
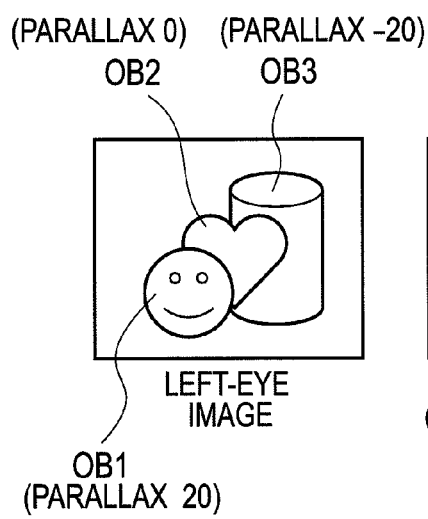
FIGS. 12A-12C are views showing an example of images to be generated in a left-eye shifted image generation unit 1505 in FIG. 11.
Figure 12B:
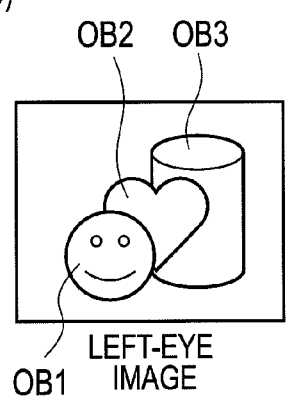
Figure 12C:
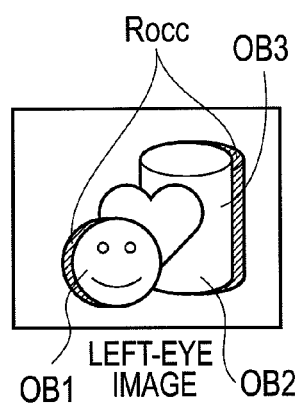

By using FIGS. 12A-12C, a description is made of an example of the left-eye image signal to be outputted in the case where the 3D stereo image pair shown in FIG. 9 is inputted to the image signal conversion unit 1520. FIG. 12A shows the inputted left-eye image signal and the already-adjusted left-eye pseudo stereoscopic parallax value DPT_L_Gn obtained by the left-eye parallax adjustment unit 1503. The already-adjusted left-eye pseudo stereoscopic parallax value DPT_L_Gn of the respective diagrams (objects) included in the left-eye image signal are 20 in the object OB1, zero in the object OB2, and −20 in the object OB3. For simplification, it is assumed that the respective objects OB1 to OB3 have uniform parallax values therein.

For comparison, FIG. 12B shows the left-eye image signal to be outputted by the image signal conversion unit 15 of the first embodiment. In the image signal conversion unit 15 of the first embodiment, the inputted left-eye image signal (image signal serving as a reference) is outputted without being subjected to the processing as mentioned above. Hence, the left-eye image signal shown in FIG. 12A and the left-eye image signal, which is shown in FIG. 12B and is to be outputted by the image signal conversion unit 15, are the same. FIG. 12C shows the parallax-adjusted left-eye image signal to be outputted by the image signal conversion unit 1520 of this embodiment. The left-eye image signal to be outputted by the image signal conversion unit 1520 includes the occlusion regions Rocc.

Returning to FIG. 11, the right-eye pseudo stereoscopic parallax generation unit 1502 detects a right-eye pseudo stereoscopic parallax value DPT_R from the right-eye image signal to be inputted thereto. The right-eye pseudo stereoscopic parallax generation unit 1502 detects the right-eye pseudo stereoscopic parallax value DPT_R based on a parallax generation method similar to that of the left-eye pseudo stereoscopic parallax generation unit 1501. Based on Expression (4), the right-eye parallax adjustment unit 1504 performs the gain adjustment for the right-eye pseudo stereoscopic parallax value DPT_R detected by the right-eye pseudo stereoscopic parallax generation unit 1502. Reference symbol G of Expression (4) denotes the pseudo stereoscopic parallax value adjustment gain G shown in FIG. 6 in a similar way to Expression (2) and Expression (3).

$$DPT\_R\_Gn = DPT\_R \times G \quad (4)$$

The already-adjusted right-eye pseudo stereoscopic parallax value DPT_R_Gn outputted by the right-eye parallax adjustment unit 1504 is inputted to the right-eye shifted image generation unit 1506. In a similar way to the already-adjusted right-eye pseudo stereoscopic parallax value DPT_L_Gn, the already-adjusted right-eye pseudo stereoscopic parallax value DPT_R_Gn also takes positive and negative values, represents that the current parallax is a parallax in the protruding direction when the already-adjusted right-eye pseudo stereoscopic parallax value DPT_R_Gn is a positive value, and represents that the current parallax is a parallax in the depth direction when the already-adjusted right-eye pseudo stereoscopic parallax value DPT_R_Gn is a negative value. The right-eye shifted image generation unit 1506 shifts the inputted right-eye image signal by the number of pixels, which is based on the already-adjusted right-eye pseudo stereoscopic parallax value DPT_R_Gn, and generates a right-eye image signal (right-eye shifted image) in which the parallax is adjusted. A shift direction is set so as to be opposite to that of the left-eye shifted image generation unit 1505.

When the already-adjusted right-eye pseudo stereoscopic parallax value DPT_R_Gn is a positive value, the right-eye shifted image generation unit 1506 generates a parallax-adjusted right-eye image signal in which the inputted right-eye image signal is shifted in a left direction by the number of pixels, which is based on the value concerned, and when the already-adjusted right-eye pseudo stereoscopic parallax value DPT_R_Gn is a negative value, generates a parallax-adjusted right-eye image signal in which the right-eye image signal is shifted in a right direction by the number of pixels, which is based on the value concerned. In the case where the pseudo stereoscopic parallax value adjustment gain G is zero, the already-adjusted right-eye pseudo stereoscopic parallax value DPT_R_Gn becomes zero, and the inputted right-eye image signal is outputted. In this embodiment, a half value of the already-adjusted right-eye pseudo stereoscopic parallax value DPT_R_Gn obtained by the right-eye parallax adjustment unit 1504 is defined as the number of shifted pixels. However, the value of the number of shifted pixels is not limited to this.

Figure 13A:
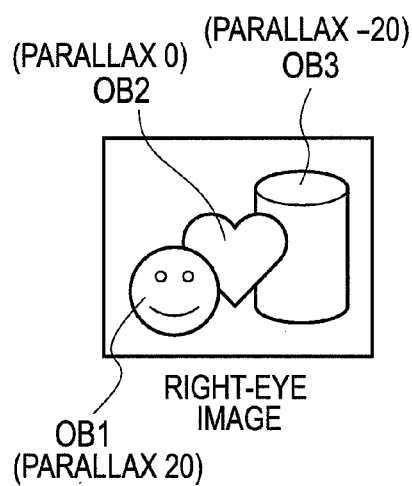
FIGS. 13A-13C are views showing an example of images to be generated in a right-eye shifted image generation unit 1506 in FIG. 11.
Figure 13B:
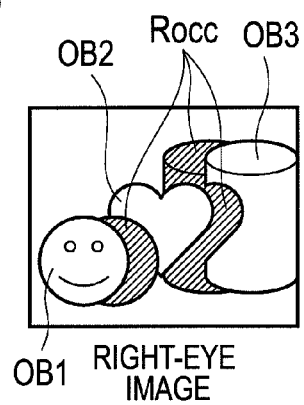
Figure 13C:
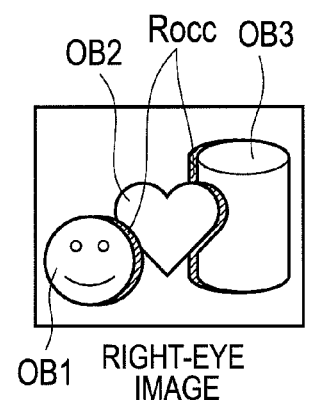

By using FIGS. 13A-13C, a description is made of an example of the right-eye image signal to be outputted in the case where the 3D stereo image pair shown in FIG. 9 is inputted to the image signal conversion unit 1520. FIG. 13A shows the inputted right-eye image signal and the already-adjusted right-eye pseudo stereoscopic parallax value DPT_R_Gn obtained by the right-eye parallax adjustment unit 1504. The already-adjusted right-eye pseudo stereoscopic parallax value DPT_R_Gn of the respective diagrams (objects) included in the right-eye image signal are 20 in the object OB1, zero in the object OB2, and −20 in the object OB3. For simplification, it is assumed that the respective objects OB1 to OB3 have uniform parallax values therein.

For comparison, FIG. 13B shows the right-eye image signal to be outputted by the image signal conversion unit 15 of the first embodiment. In the first embodiment, by using the synthetic parallax value DPT_MIX in which the 3D signal parallax value DPT and the pseudo stereoscopic parallax value DPT_2D are synthesized with each other by the pseudo stereoscopic parallax synthesis unit 152, the left-eye image signal is subjected to pixel shift, and the right-eye image signal is generated. Therefore, as shown in FIG. 13B, the occlusion regions Rocc become wide. FIG. 13C shows the parallax-adjusted right-eye image signal to be outputted by the image signal conversion unit 1520 of this embodiment. The object OB1 is shifted by 10 pixels in the left direction, and the object OB3 is shifted by 10 pixels in the right direction. The right-eye image signal to be outputted by the image signal conversion unit 1520 includes slight occlusion regions Rocc.

In FIG. 13B according to the first embodiment, images in which the object OB1 and the object OB3 are shifted by the same number of pixels as the parallax value form the right-eye image signal. In FIG. 13C according to the second embodiment, the half value of parallax value is defined as the number of shifted pixels, and accordingly, the occlusion regions Rocc become smaller than those of the first embodiment.

In the case where an image signal in which the parallax difference in the image is larger than the threshold value TH2, that is, an image signal in which the stereoscopic degree F. is one and the pseudo stereoscopic parallax value adjustment gain G becomes zero is inputted as the inputted stereo image pair, the stereoscopic image generation apparatus of the second embodiment, which includes the image signal conversion unit 1520, directly outputs the image signal. The values of the left-eye pseudo stereoscopic parallax value DPT_L_Gn and the right-eye pseudo stereoscopic parallax value DPT_R_Gn, which the image signal conversion unit 1520 calculates based on Expression (3) and Expression (4), become zero, and the pixel shift for the inputted image signal is not performed, and accordingly, the inputted image signal can be outputted without being deteriorated.

Based on the stereoscopic degree F., the image signal conversion unit 1520 obtains the amount of pixel shift, by which the pixel of at least one monocular video signal of the left-eye image signal and the right-eye image signal is to be shifted, and generates a shifted video signal shifted based on the amount of pixel shift. The stereoscopic degree F. is calculated based on the 3D signal parallax value DPT obtained in the 3D signal parallax detection unit 13. The image signal conversion unit 1520 includes the pseudo stereoscopic parallax estimation units 1501 and 1502, which calculate the left-eye pseudo stereoscopic parallax value DPT_L and the right-eye pseudo stereoscopic parallax value DPT_R from the monocular video signal, and calculates the amount of pixel shift based on the stereoscopic degree F., the left-eye pseudo stereoscopic parallax value DPT_L and the right-eye pseudo stereoscopic parallax value DPT_R.

Note that, in this embodiment, the left-eye-use pseudo stereoscopic parallax generation units (1501, 1503, 1505), which generate the parallax-adjusted left-eye image signal from the left-eye image signal, and the right-eye-use pseudo stereoscopic parallax generation units (1502, 1504, 1506), which generate the parallax-adjusted right-eye image signal from the right-eye image signal, are provided separately from each other; however, the embodiment is not limited to this. Such a configuration may be adopted, in which the left-eye pseudo stereoscopic parallax value DPT_L outputted from the left-eye pseudo stereoscopic parallax estimation unit 1501 is also inputted to the right right-eye parallax adjustment unit 1504, whereby the subsequent left-eye shifted image generation unit 1505 and the subsequent right-eye shifted image generation unit 1506 are converged to one shifted-image generation unit.

In the inputted 3D stereo image pair, an object in the image is not always present at the same pixel position in the right eye image and the left eye image. Therefore, if the configuration in which the pseudo stereoscopic parallax generation units are converted to one unit is adopted, then in the case of using the pseudo stereoscopic parallax value obtained for the left-eye object, an image other than the object is sometimes shifted in the right-eye shifted image though the object can be subjected to the pixel shift in the left-eye shifted image. Hence, it is more ideal to provide the pseudo stereoscopic parallax generation units, which are separate from each other for the left-eye use and the right-eye use.

Third Embodiment

By using FIG. 14, a description is made of a stereoscopic image generation apparatus 103 of a third embodiment. The stereoscopic image generation apparatus 103 of the third embodiment is different from the stereoscopic image generation apparatus of the second embodiment in that the stereoscopic image generation apparatus 103 includes an input signal acquisition unit 11b, a stereoscopic degree calculation unit 1430 and an image signal conversion unit 1530 and does not include the 3D signal parallax detection unit 13. A description is made below only of portions different from those of the second embodiment.

The input signal acquisition unit 11b acquires the 3D video signal, the 3D format identification signal and imaging information data from the 3D signal recording device 2. The imaging information data mentioned here is a variety of information in the event where the 3D video signal is imaged, such as object distance information, imaged scene mode information, and lens focal length information. As a representative one, there is Exif data or the like, which is included in a picture image. The input signal acquisition unit 11b acquires the imaging information data and outputs the acquired imaging information data to the stereoscopic degree calculation unit 1430.

Figure 15:
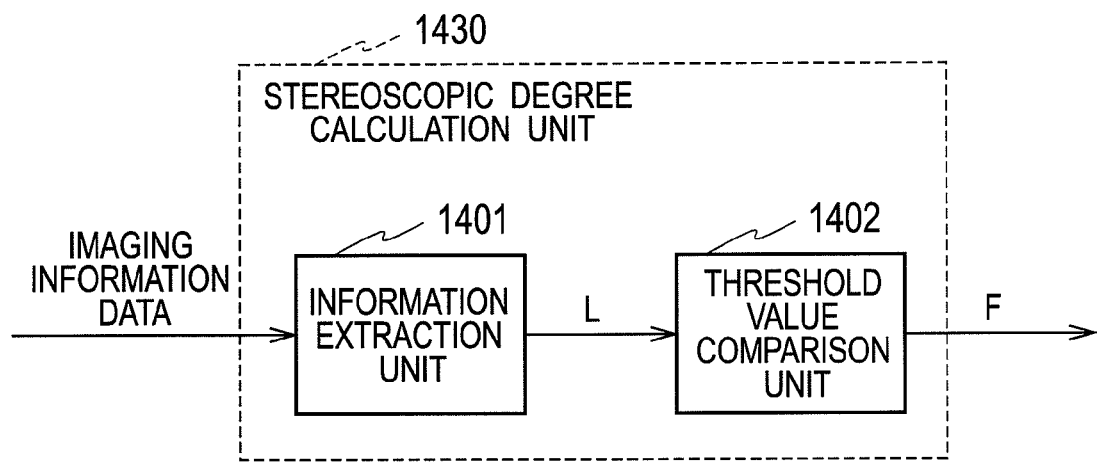
FIG. 15 is a block diagram showing a specific configuration of a stereoscopic degree determination unit 1430 in FIG. 14.
Figure 16:
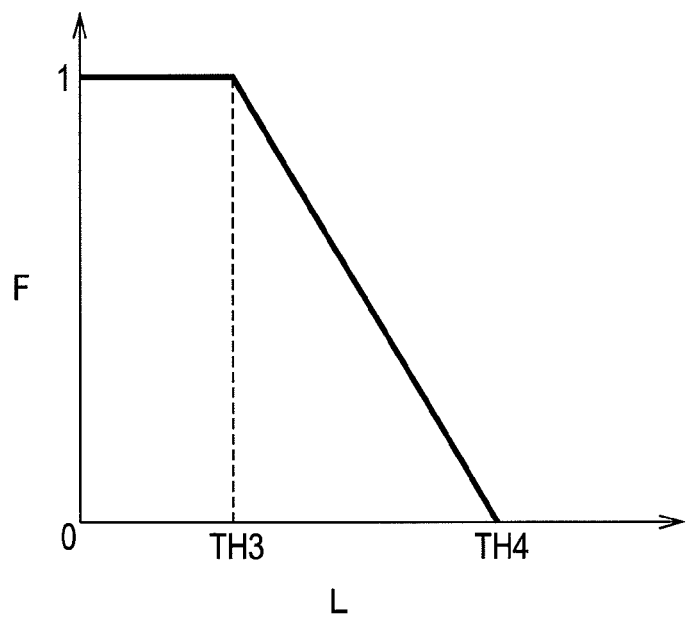
FIG. 16 is a characteristic diagram of a stereoscopic degree F. to be generated by the stereoscopic degree determination unit 1430 in FIG. 14.

The stereoscopic degree calculation unit 1430 calculates the stereoscopic degree F. based on the imaging information data acquired by the input signal acquisition unit 11b. FIG. 15 shows a detailed configuration of the stereoscopic degree calculation unit 1430. The stereoscopic degree calculation unit 1430 includes an information extraction unit 1401 and a threshold value comparison unit 1402. The information extraction unit 1401 extracts the object distance information from the inputted imaging information data, and outputs the extracted object distance information as object distance information L. As shown in FIG. 16, the threshold value comparison unit 1402 compares the object distance information with a threshold value TH3 and a threshold value TH4, and outputs the stereoscopic degree F. Values of the threshold value TH3 and the threshold value TH4 just need to be set appropriately.

In the case where the object distance information is smaller than the threshold value TH3, the value of the stereoscopic degree F. becomes one. If the object distance information L is between the threshold value TH3 and the threshold value TH4, then the stereoscopic degree F. becomes a value that is decreased linearly from one to zero. In the case where the object distance information L is larger than the threshold value TH4, the value of the stereoscopic degree F becomes zero.

Based on the stereoscopic degree F. calculated by the stereoscopic degree calculation unit 1430, the image signal conversion unit 1530 calculates the amount of pixel shift, by which the pixel of at least one monocular video signal of the left-eye image signal and the right-eye image signal is to be shifted. Moreover, the image signal conversion unit 1530 includes a pseudo stereoscopic parallax calculation unit that calculates the pseudo stereoscopic parallax value from the monocular video signal, and calculates the amount of pixel shift based on the stereoscopic degree F. and the pseudo stereoscopic parallax value.

As described above, in the stereoscopic image generation apparatus 103 in the third embodiment, the stereoscopic degree F. of the inputted stereo image pair is determined based on the imaging information data. In such a way, the stereoscopic degree F. can be determined appropriately in response to a variety of imaging conditions such as the object distance.

Fourth Embodiment

In the case where a distant view image is displayed, though back-and-forth vision between the objects present in the image is obtained, there is a case where the objects themselves are poor in stereoscopic vision and each of the objects looks flat. This is referred to as a cardboard phenomenon (or a cardboard effect). In the case where the cardboard phenomenon has occurred, a real 3D image is not formed. A fourth embodiment is configured so as to generate the stereoscopic image with the stereoscopic vision in a similar way to the first to third embodiments, and further, to improve the stereoscopic vision of each of the objects.

Figure 17:
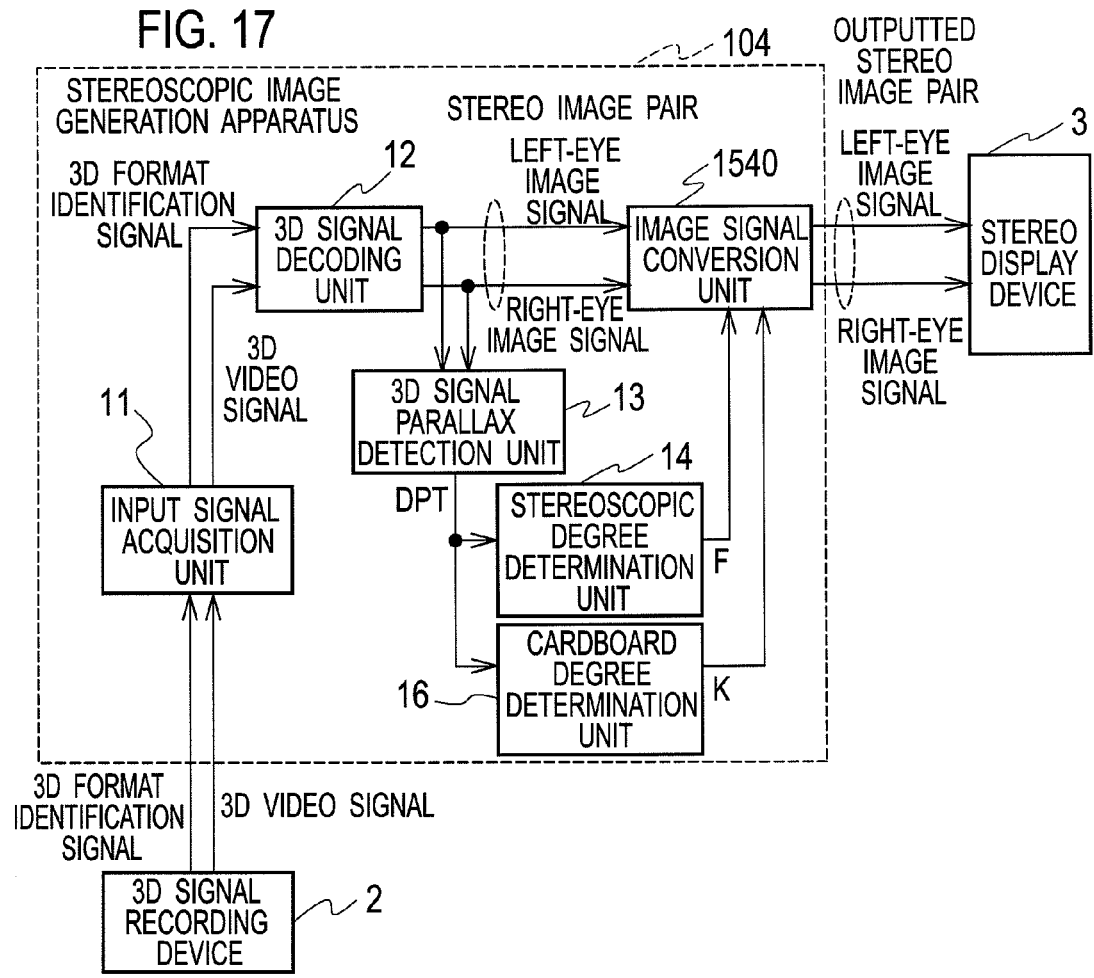
FIG. 17 is a block diagram showing a fourth embodiment of the stereoscopic image generation apparatus.

In FIG. 17, a stereoscopic image generation apparatus 104 of the fourth embodiment is different from the stereoscopic image generation apparatus 101 of the first embodiment in including an image signal conversion unit 1540 and a cardboard degree determination unit 16. An extent of the cardboard phenomenon is referred to as the cardboard degree.

Figure 18:
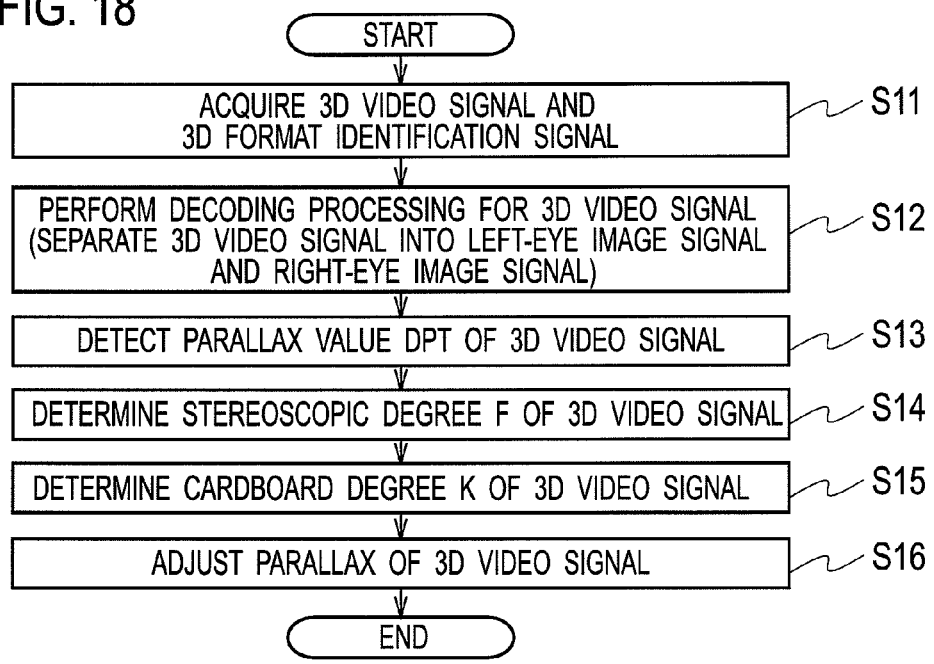
FIG. 18 is a flowchart for explaining operations of the fourth embodiment shown in FIG. 17.

While referring to a flowchart of FIG. 18, a description is made of operations of the respective units of the stereoscopic image generation apparatus 104. Step S11 to Step S14 are the same operations as the operation Step S1 to operation Step S4 of the respective units of the stereoscopic image generation apparatus 101 of the first embodiment, which is shown in FIG. 2, and accordingly, a description thereof is omitted. Step S15 is an operation of the cardboard degree determination unit 16 shown in FIG. 17, and Step S16 is an operation of the image signal generation unit 1540 shown in FIG. 17. Based on the 3D signal parallax value DPT, the cardboard degree determination unit 16 determines a cardboard degree of the 3D video signal (Step S15).

Figure 19:
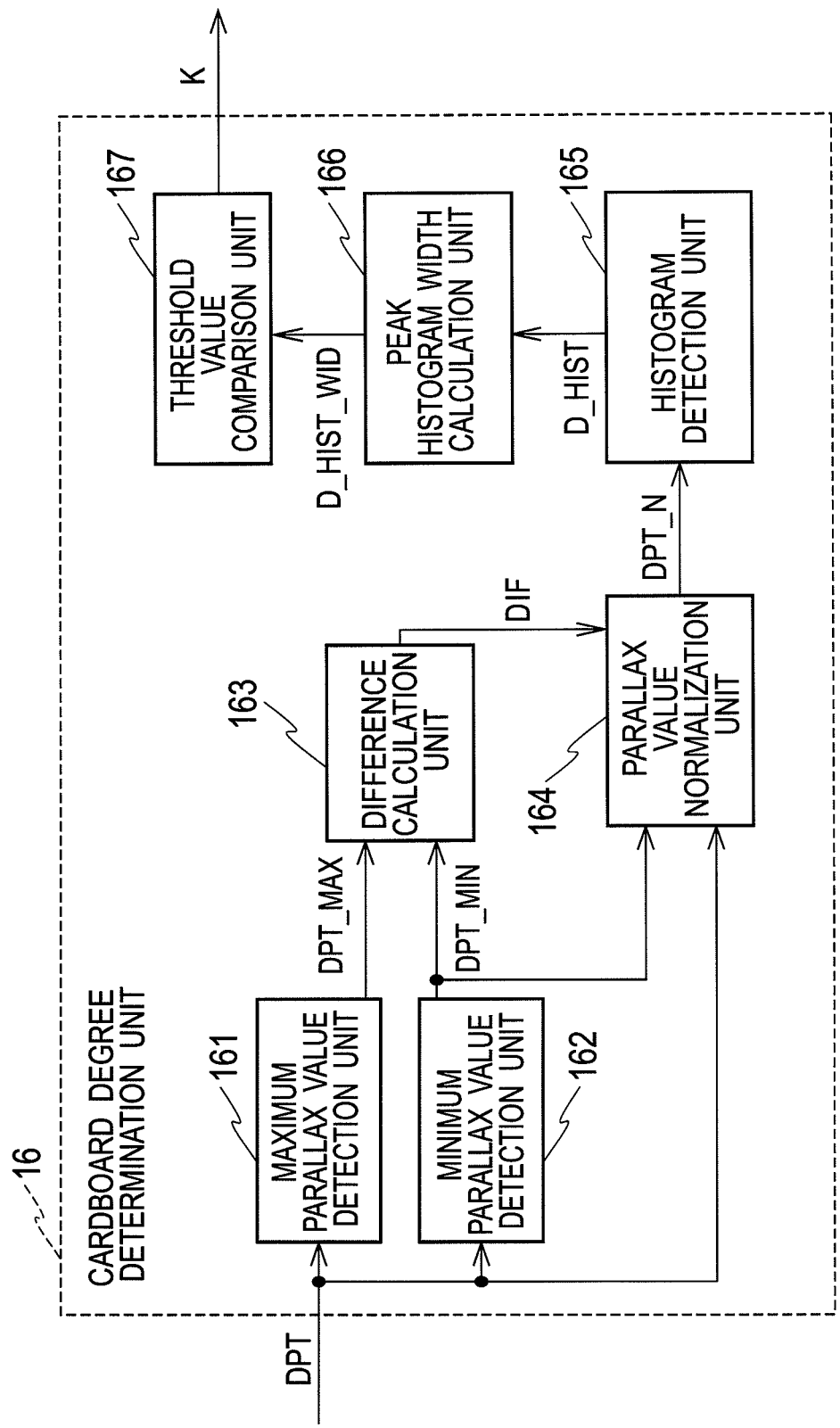
FIG. 19 is a block diagram showing a specific configuration of a cardboard degree determination unit 16 in FIG. 17.

By using FIG. 19, a description is made of a specific configuration and operations of the cardboard degree determination unit 16. As shown in FIG. 19, the cardboard degree determination unit 16 includes a maximum parallax value detection unit 161, a minimum parallax value detection unit 162, a difference calculation unit 163, a parallax value normalization unit 164, a histogram detection unit 165, a peak histogram width calculation unit 166, and a threshold value comparison unit 167. The maximum parallax value detection unit 161, the minimum parallax value detection unit 162 and the difference calculation unit 163 operate similarly to the maximum parallax value detection unit 141, the minimum parallax value detection unit 142, and the difference calculation unit 143 in the stereoscopic degree determination unit 14. The maximum parallax value detection unit 141, the minimum parallax value detection unit 142 and the difference calculation unit 143 and the maximum parallax value detection unit 161, the minimum parallax value detection unit 162 and the difference calculation unit 163 may be integrated for use with each other, respectively.

To the parallax value normalization unit 164, there are inputted the 3D signal parallax value DPT, the minimum 3D signal parallax value DPT_MIN and the 3D parallax difference value DIF. Based on Expression (5), the parallax value normalization unit 164 offsets the 3D signal parallax value DPT, and obtains an offset parallax value DPT_OFS. The 3D signal parallax value DPT is converted into the offset parallax value DPT_OFS, whereby a minimum value of the 3D signal parallax value DPT becomes zero, and the offset parallax value DPT_OFS becomes a positive value.

$$DPT\_OFS = DPT - DPT\_MIN \qquad (5)$$

Moreover, based on Expression (6), the parallax value normalization unit 164 normalizes the offset parallax value DPT_OFS, and obtains a normalized parallax value DPT_N. Such normalization processing in the parallax value normalization unit 164 is performed in order to always set a detection range at a full range in the event of detecting a histogram of the parallax value in the subsequent histogram detection unit

165. The offset parallax value DPT_OFS is normalized and converted into the normalized parallax value DPT_N, whereby the normalized parallax value DPT_N takes an integer value within a range of 0 to 255. Here, the offset parallax value DPT_OFS is normalized to an 8-bit range; however, a range within which the offset parallax value DPT_OFS is to be normalized is not limited to the 8-bit range.

$$DPT\_N = DPT\_OFS \times 255/DIF \qquad (6)$$

The histogram detection unit 165 detects a histogram of the normalized parallax value DPTN_N. The histogram detection unit 165 includes 256 counters D_CNT[i] (i is integers of 0 to 255) corresponding to the respective values of the normalized parallax value DPT_N. The counters D_CNT[i] count how many values of the normalized parallax value DPT_N are present. The histogram detection unit 165 outputs a value, which is obtained by multiplying count values of the counters D_CNT[i] by 255 and dividing such multiplication resultants by the total number of pixels of the 3D video signal, as parallax value histograms D_HIST[i] (i is integers of 0 to 255).

The peak histogram width calculation unit 166 calculates a peak histogram width D_HIST_WID based on the parallax value histograms D_HIST[i].

Figure 20:
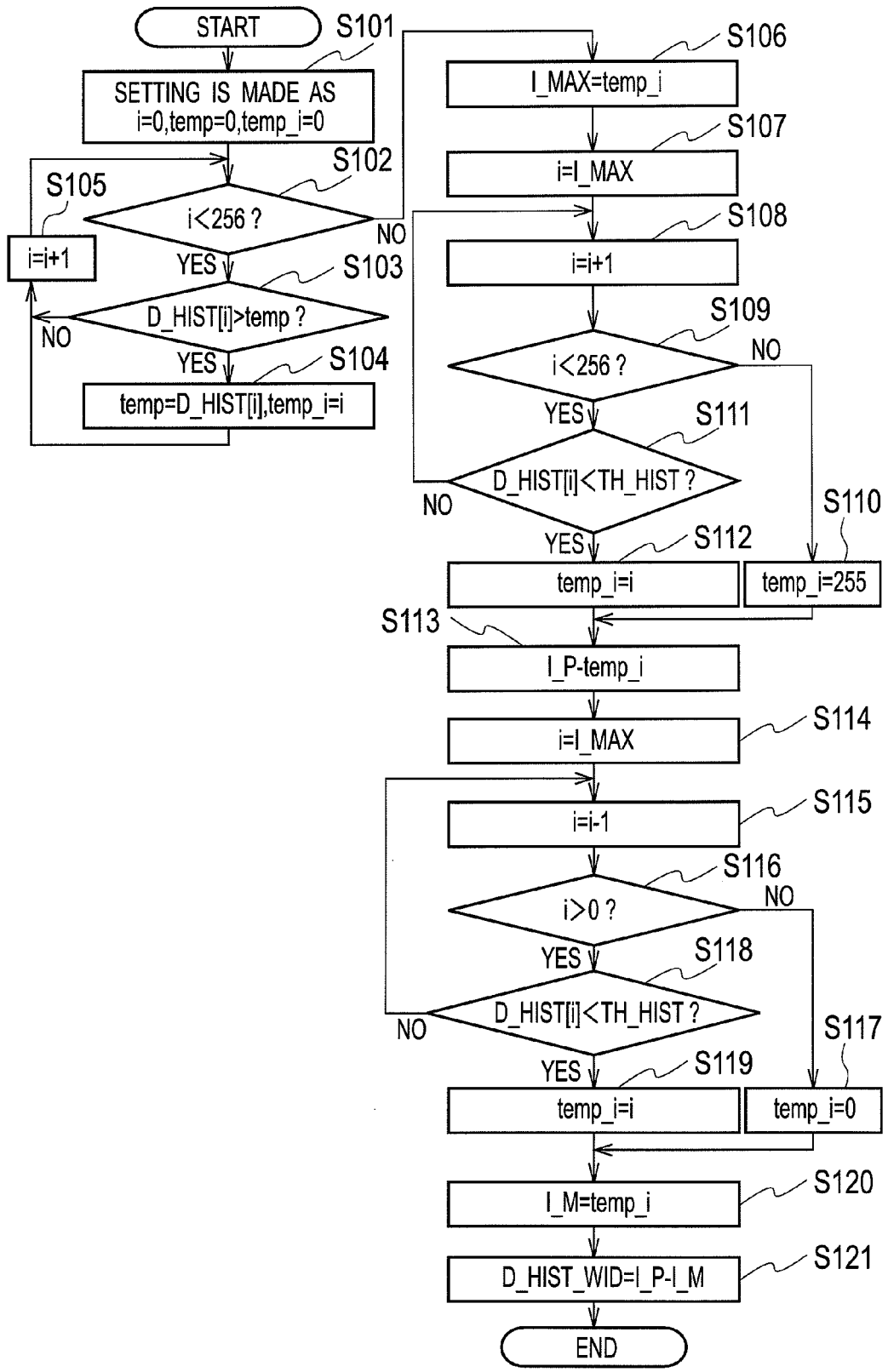
FIG. 20 is a flowchart for explaining operations of a peak histogram width calculation unit 166 in FIG. 19.

By using a flowchart of FIG. 20, a description is made of specific operations of the peak histogram width calculation unit 166. In Steps S101 to S106, the peak histogram width calculation unit 166 obtains a value of i, which indicates a maximum value, as I_MAX from among the parallax value histograms D_HIST[i]. In FIG. 20, i is an integer of 0 to 255, temp is a temporal maximum value at each point of time, and temp_i is a value indicating any of 0 to 255. In FIG. 20, in Step S101, setting is made as i=0, temp=0 and temp_i=0, and in Step S102, it is determined whether or not i<256 is satisfied.

If i<256 is satisfied in Step S102 (YES), then in Step S103, it is determined that D_HIST[i]>temp is satisfied. If D_HIST[i]>temp is satisfied (YES), then in Step S104, setting is made as temp=D_HIST[i] and temp_i=i, and in Step S105, increment is made as i=i+1, and then the operations return to Step S102. If D_HIST[i]>temp is not satisfied in Step S103 (NO), then increment is made as i=i+1 in Step S105, and the operations return to Step S102. If i<256 is not satisfied in Step S102 (NO), then in Step S106, I_MAX=temp_i is set. In such a way, the value of i, which indicates the maximum value, is detected as I_MAX.

In Steps S107 to S113, the peak histogram width calculation unit 166 increases the value of i one by one from I_MAX, and obtains a value of i, in which D_HIST [i] first becomes smaller than a predetermined threshold value TH_HIST, as I_P. i=I_MAX is set in Step S107, increment is made as i=i+1 in Step S108, and it is determined whether or not i<256 is satisfied in Step S109. If i<256 is not satisfied (NO), then in Step S110, temp_i=255 is set, and the operations are shifted to Step S113, and if i<256 is satisfied (YES), then in Step S111, it is determined whether or not D_HIST[i]<TH_HIST is satisfied.

If D_HIST[i]<TH_HIST is satisfied (YES), then temp_i=1 is set in Step S112, and the operations are shifted to Step S113, and if D_HIST [i]<TH_HIST is not satisfied (NO), then the operations are returned to step S108. I_P=temp_i is set in Step S113. In such a way, the value of i is increased one by one from I_MAX, and a value of i of I_P, in which D_HIST [i] first becomes smaller than the threshold value TH_HIST, is detected.

In Step S114 to S120, the peak histogram width calculation unit 166 reduces the value of i one by one from I_MAX, and obtains a value of i, in which D_HIST[i] first becomes smaller than the predetermined threshold value TH_HIST, as I_M. i=I_MAX is set in Step S114, decrement is made as i=i-1 in Step S115, and it is determined whether or not i>0 is satisfied in Step S116. If i>0 is not satisfied (NO), then in Step S117, temp_i=0 is set, and the operations are shifted to Step S120, and if i>0 is satisfied (YES), then in Step S118, it is determined whether or not D_HIST[i]<TH_HIST is satisfied.

If D_HIST[i]<TH_HIST is satisfied (YES), then temp_i=1 is set in Step S119, and the operations are shifted to Step S120, and if D_HIST[i]<TH_HIST is not satisfied (NO), then the operations are returned to step S115. I_M=temp_i is set in Step S120. In such a way, the value of i is reduced one by one from I_MAX, and a value of i of I_M, in which D_HIST[i] first becomes smaller than the threshold value TH_HIST, is detected. Finally, in Step S121, I_M is subtracted from I_P, and the peak histogram width D_HIST_WID is calculated.

Figure 21:
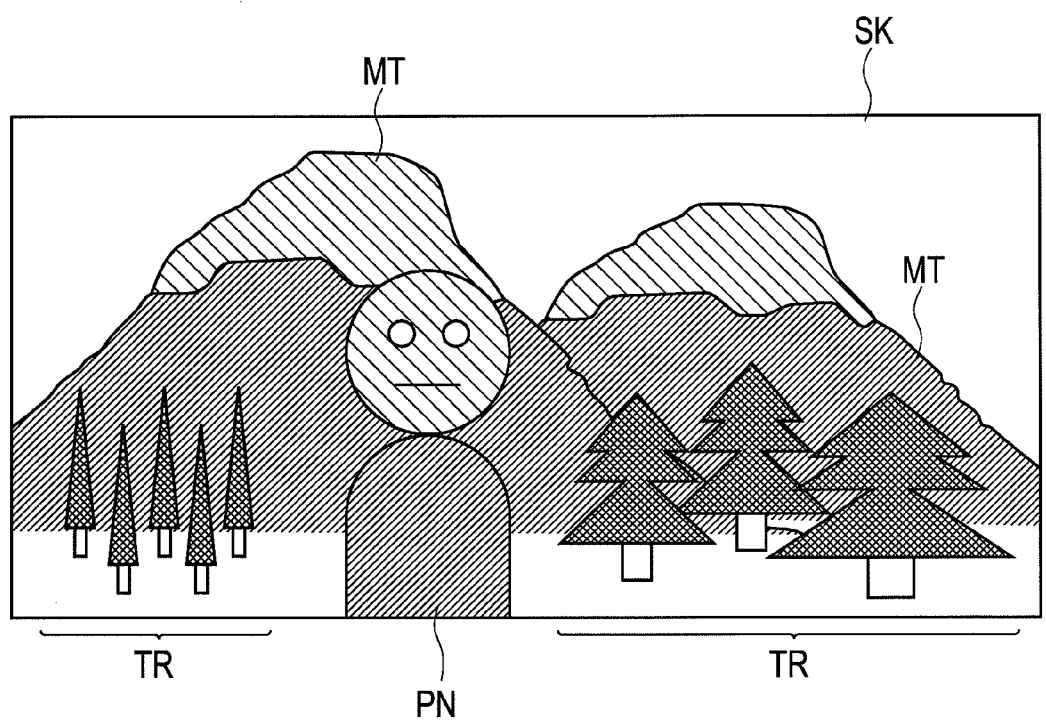
FIG. 21 is a view showing an example of an image in which a cardboard phenomenon occurs.
Figure 22:
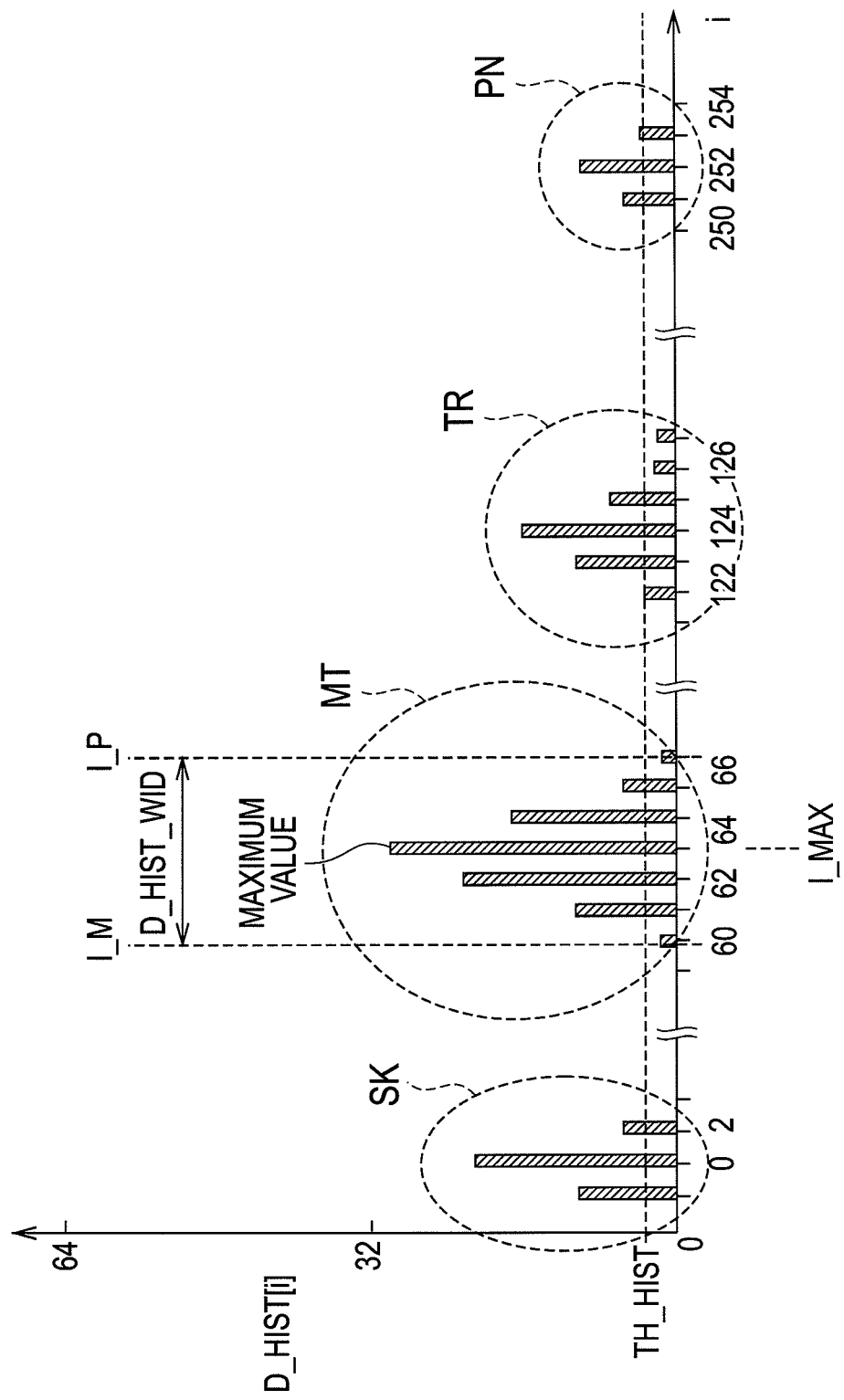
FIG. 22 is a diagram showing a parallax value histogram detected for the image shown in FIG. 21 by a histogram detection unit 165 in FIG. 19 and the peak histogram width calculated therefor by the peak histogram width calculation unit 166.

It is assumed that the image by the inputted 3D video signal is such an image as shown in FIG. 21. The image of FIG. 21 shows such a composition in which a person is imaged on a distant view taken as a background. The composition shown in FIG. 21 includes, as objects, a sky SK, moutains MT, trees TR, and a person PN. In the case where the image shown in FIG. 21 is converted into the 3D video signal, relationships between the values of i and the parallax value histogram D_HIST[i] become as shown in FIG. 22. The respective portions of the sky SK, the moutains MT, the trees TR and the person PN in the parallax value histogram D_HIST[i] are shown by being surrounded by broken lines. The maximum value of the parallax value histogram D_HIST[i] is present on the portion of the histogram that is based on the mountains MT, and IMAX is 64. I_P is 67, I_M is 61, and the peak histogram width D_HIST_WID becomes 6.

Figure 23:
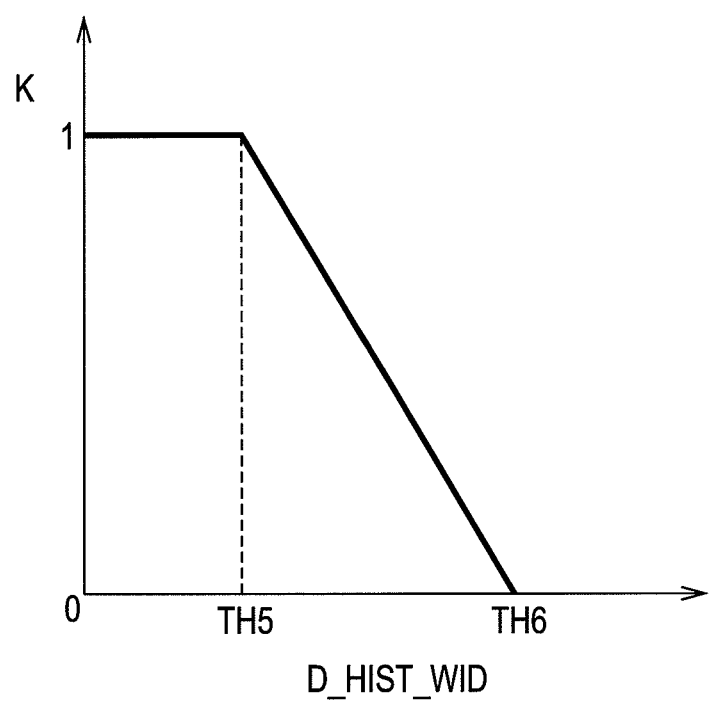
FIG. 23 is a characteristic diagram of a cardboard degree K to be generated by the cardboard degree determination unit 16 in FIG. 17.

Returning to FIG. 19, the threshold value comparison unit 167 compares the peak histogram width D_HIST_WID, which is inputted from the peak histogram width calculation unit 166, with predetermined threshold values TH5 and TH6, and calculates a cardboard degree K. As shown in FIG. 23, if the peak histogram width D_HIST_WID is smaller than the threshold value TH5, then the cardboard degree K becomes one, and if the peak histogram width D_HIST_WID is larger than the threshold value TH6, then the cardboard degree K becomes zero. If the peak histogram width D_HIST_WID is between the threshold value TH5 and the threshold value TH6, then the cardboard degree K becomes a value that is decreased linearly from one to zero.

As the difference between the parallax values in the object that occupies a largest area in the image by the 3D video signal is becoming smaller, it becomes more likely to be recognized that the cardboard phenomenon has occurred, and the cardboard degree K becomes a high value.

Returning to FIG. 17 and FIG. 18, to the image signal conversion unit 1540, the stereoscopic degree F. and the cardboard degree K are inputted. The image signal conversion unit 1540 outputs an image in which the parallax being adjusted, by shifting the pixel of at least one signal of the left-eye image signal and the right-eye image signal, which are the stereo image pair outputted from the 3D signal decoding unit 12 (Step S16). The image signal conversion unit 1540 can be realized, for example, by applying the pseudo stereoscopic image generation apparatus as described in Patent Literature 1.

Figure 24:
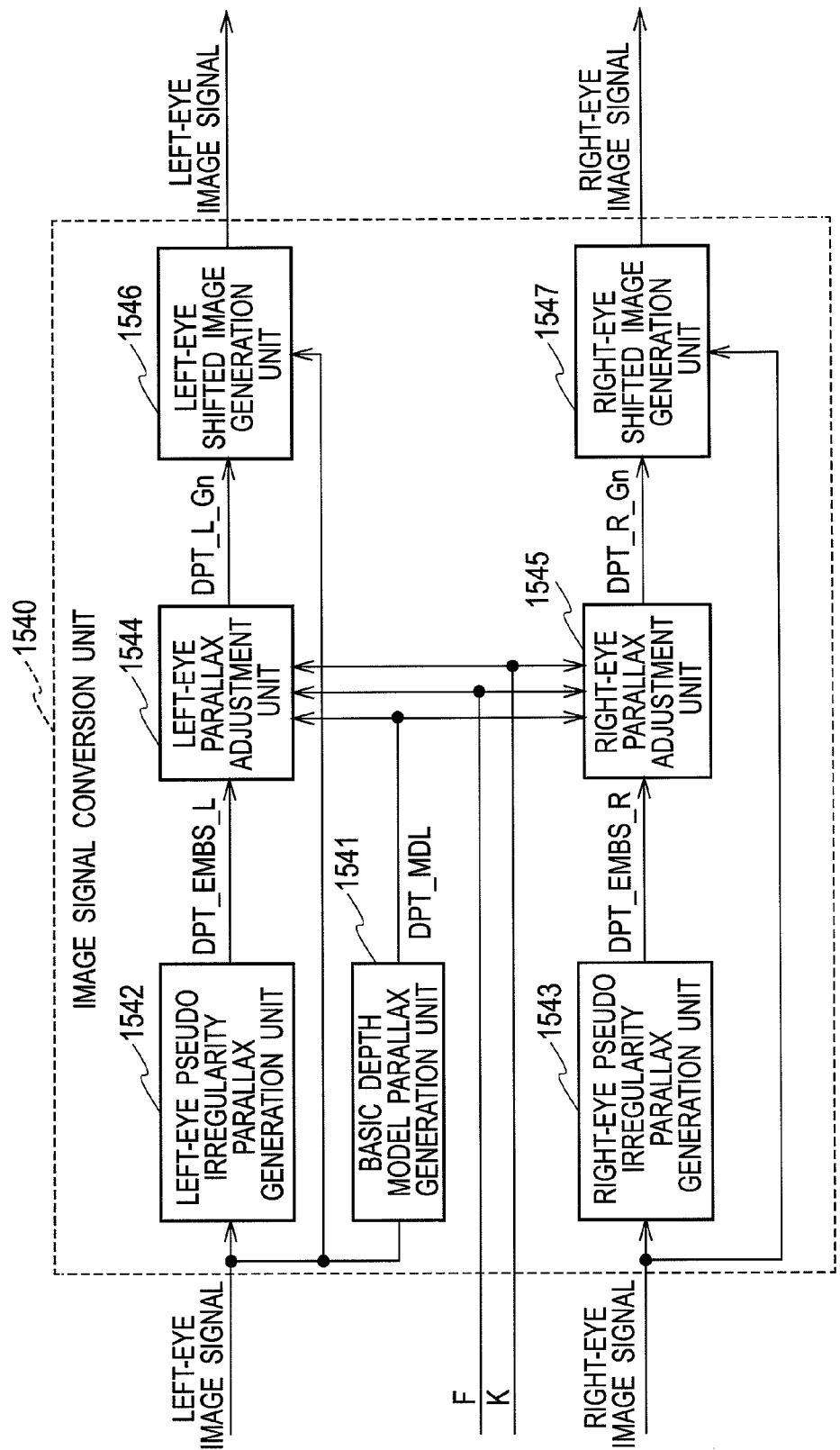
FIG. 24 is a block diagram showing a specific configuration of an image signal conversion unit 1540 in FIG. 17.

By using FIG. 24, a description is made of a specific configuration and operations of the image signal conversion unit 1540. As shown in FIG. 24, the image signal conversion unit 1540 includes a basic depth model parallax generation unit 1541, a left-eye pseudo irregularity parallax generation unit 1542, a right-eye pseudo irregularity parallax generation unit 1543, a left-eye parallax adjustment unit 1544, a right-eye parallax adjustment unit 1545, a left-eye shifted image generation unit 1546, and a right-eye shifted image generation unit 1547.

Figure 25:
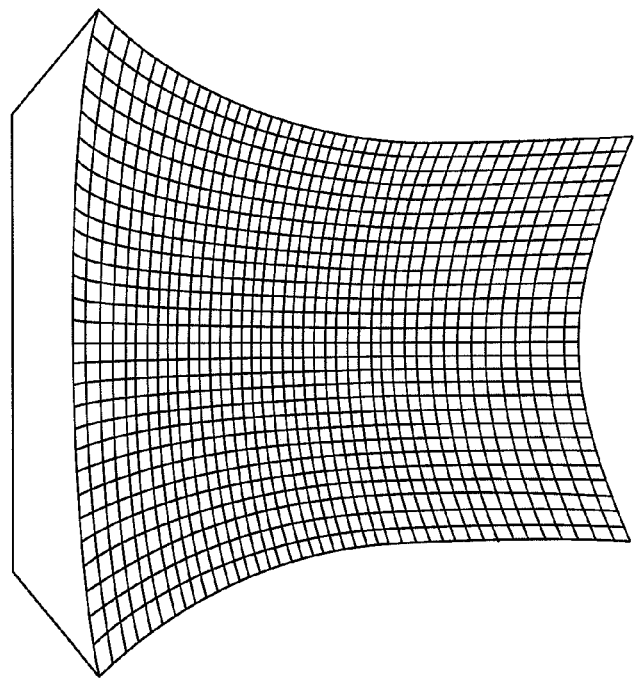
FIG. 25 is a view showing a first example of a basic depth model to be used in a basic depth model parallax generation unit 1541 in FIG. 24.
Figure 26:
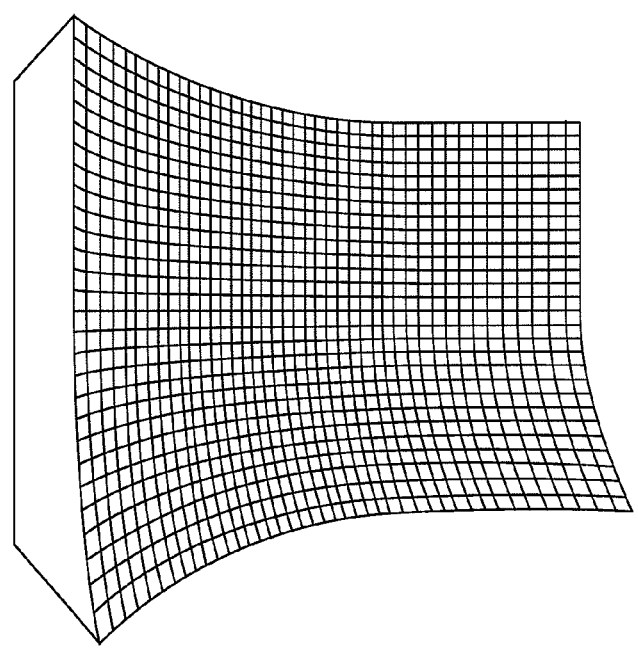
FIG. 26 is a view showing a second example of the basic depth model to be used in the basic depth model parallax generation unit 1541 in FIG. 24.
Figure 27:
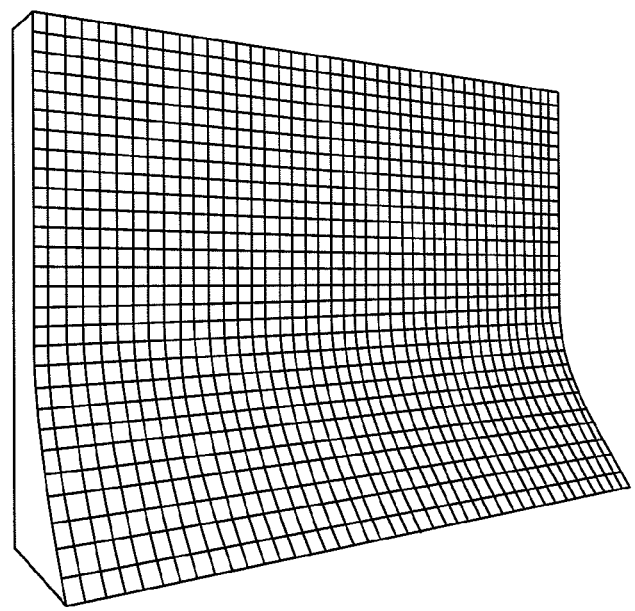
FIG. 27 is a view showing a third example of the basic depth model to be used in the basic depth model parallax generation unit 1541 in FIG. 24.

The basic depth model parallax generation unit 1541 includes a plurality of basic depth models. FIG. 25 to FIG. 27 show examples of the basic depth models. The basic depth models are models for deciding the parallax value of the whole of the frame, and can be configured by computational expressions which shift the respective pixels on a plane in a protruding direction or a depth direction, which is owned by characteristics of non-planar shapes as shown in FIG. 25 to FIG. 27. The basic depth model parallax generation unit 1541 selects one from the plurality of basic depth models or mixes the plurality of basic depth models with one another based on a feature of the inputted left-eye image signal, and outputs a basic depth model parallax value DPT_MDL. The basic depth model parallax value DPT_MDL stands for a parallax in the protruding direction when the value concerned is a positive value, and stands for a parallax in the depth direction when the value concerned is a negative value.

Here, the basic depth model parallax value DPT_MDL is generated based on the feature of the left-eye image signal; however, the basic depth model parallax value DPT_MDL may be generated based on a feature of the right-eye image signal, or the basic depth model parallax value DPT_MDL may be generated based on the features of both of the left-eye image signal and the right-eye image signal. The basic depth model parallax generation unit 1541 is a parallax generation unit that generates parallax value data indicating the parallax value representing the stereoscopic shape of the whole of the frame, which is to be set in response to the composition of the image by the 3D video signal.

Based on the feature of the inputted left-eye image signal, the left-eye pseudo irregularity parallax generation unit 1542 estimates irregularity information of the objects in the image in the unit of pixel, and outputs the estimated irregularity information as a left-eye pseudo irregularity parallax value DPT_EMBS_L. The human being has visual performance that a red thing is likely to be recognized so as to be located on the front side in the event of estimating the irregularity information. By utilizing this visual performance, the left-eye pseudo irregularity parallax generation unit 1542 calculates the left-eye pseudo irregularity parallax value DPT_EMBS_L by using Expression (7). Reference symbol R_LEFT denotes an R signal of the left-eye image signal.

$$DPT\_EMBS\_L = R\_LEFT - 128 \quad (7)$$

In this embodiment, the R signal is an 8-bit signal and takes values of 0 to 255, and when R_LEFT as the R signal is 128 as a median, the left-eye pseudo irregularity parallax value DPT_EMBS_L becomes zero. Here, the R signal is used in the event of calculating the left-eye pseudo irregularity parallax value DPT_EMBS_L; however, the signal for use is not limited to the R signal, and the left-eye pseudo irregularity parallax value DPT_EMBS_L may be calculated by using a G signal or a B signal, or a combination of any of the R, G and B signals, and further, a brightness signal. The left-eye pseudo irregularity parallax generation unit 1542 is a parallax generation unit that, based on a color component or brightness component of the left-eye image signal, generates parallax value data indicating the pseudo parallax value to be given to the left-eye image signal.

The left-eye parallax adjustment unit 1544 synthesizes the basic depth model parallax value DPT_MDL, which is outputted from the basic depth model parallax generation unit 1541, and the left-eye pseudo irregularity parallax value DPT_EMBS_L, which is outputted from the left-eye pseudo irregularity parallax generation unit 1542, with each other while adjusting gains thereof, and generates the already-adjusted left-eye pseudo stereoscopic parallax value DPT_L_Gn. Based on Expression (8), the left-eye parallax adjustment unit 1544 synthesizes the basic depth model parallax value DPT_MDL and the left-eye pseudo irregularity parallax value DPT_EMBS_L with each other.

$$DPT\_L\_Gn = DPT\_MDL \times Gf + DPT\_EMBS\_L \times Gk \quad (8)$$

Figure 28:
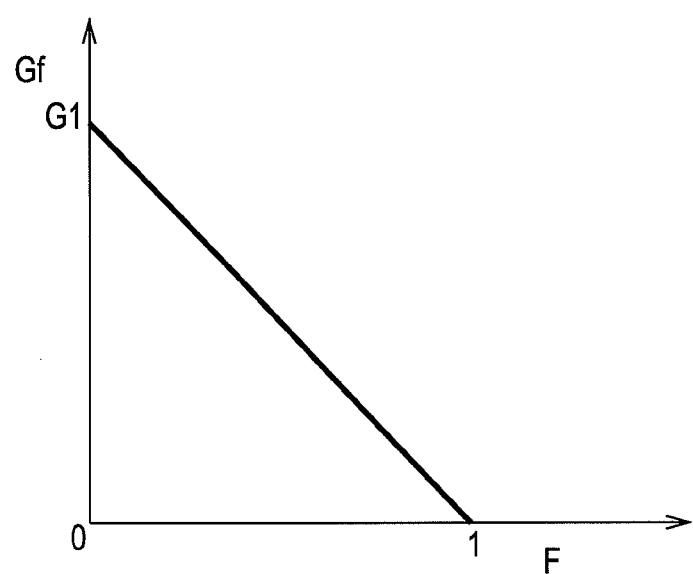
FIG. 28 is a characteristic diagram of a gain Gf with respect to a basic depth model parallax value DPT_MDL to be used in a left-eye parallax adjustment unit 1544 and a right-eye parallax adjustment unit 1545 in FIG. 24.
Figure 29:
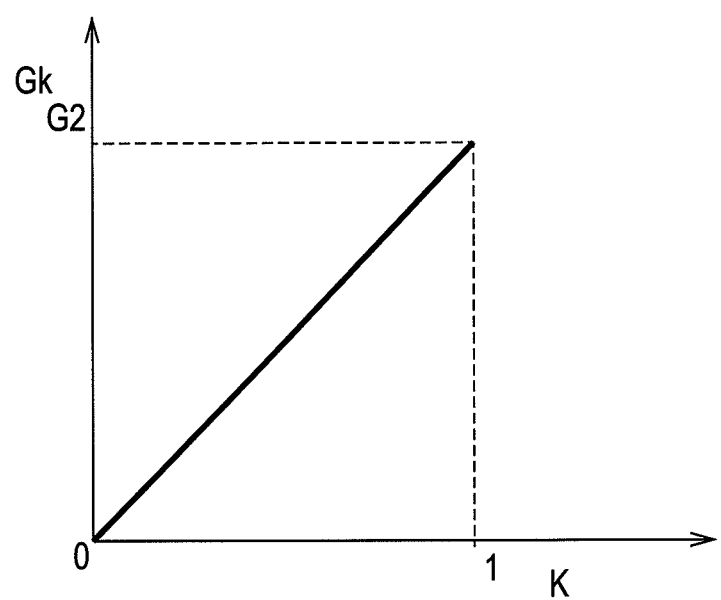
FIG. 29 is a characteristic diagram of a gain Gk with respect to a left-eye pseudo irregularity parallax value DPT_EMBS_L and a right-eye pseudo irregularity parallax value DPT_EMBS_R, which are to be used in the left-eye parallax adjustment unit 1544 and the right-eye parallax adjustment unit 1545 in FIG. 24.

Reference symbol Gf in Expression (8) denotes a gain for the basic depth model parallax value DPT_MDL. The gain Gf has characteristics as shown in FIG. 28, and becomes a value corresponding to the stereoscopic degree F. The gain Gf is an arbitrary setting value that becomes G1 when the stereoscopic degree F. is zero, is linearly decreased as the stereoscopic degree F. is approaching one, and becomes zero when the stereoscopic degree F. is one. Reference symbol Gk in Expression (8) denotes a gain for the left-eye pseudo irregularity parallax value DPT_EMBS_L. The gain Gk has characteristics as shown in FIG. 29, and becomes a value corresponding to the cardboard degree K. The gain Gk becomes zero when the cardboard degree K is zero, is linearly increased as the cardboard degree K is approaching one, and becomes an arbitrary setting value that becomes G2 when the cardboard degree K is one.

The gain Gf has the characteristics as shown in FIG. 28, and the gain Gk has the characteristics as shown in FIG. 29. Accordingly, when the back-and-forth vision between the objects in the image by the inputted stereo image pair (3D video signal) is poor, the basic depth model parallax value DPT_MDL is emphasized, and when the irregularity vision (stereoscopic vision) of each of the objects themselves in the image by the stereo image pair is poor, the left-eye pseudo irregularity parallax value DPT_EMBS_L is emphasized.

Based on the already-adjusted left-eye pseudo stereoscopic parallax value DPT_L_Gn outputted from the left-eye parallax adjustment unit 1544, the left-eye shifted image generation unit 1546 shifts the pixel of the left-eye image signal, and generates the left-eye shifted image. The left-eye shifted image is outputted as a left-eye image signal in which the parallax is adjusted.

Figure 30A:
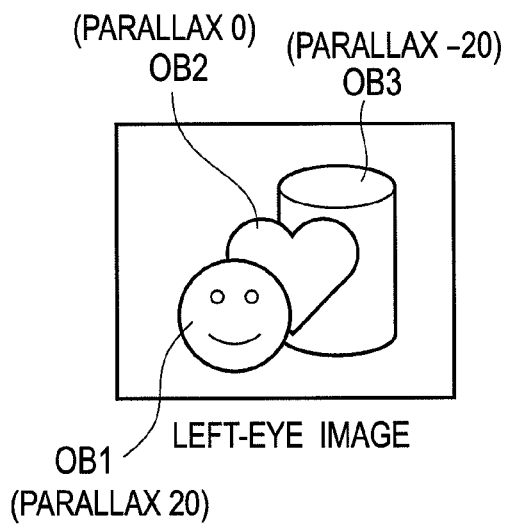
FIGS. 30A and 30B are views for explaining operations of a left-eye shifted image generation unit 1546 in FIG. 24.
Figure 30B:
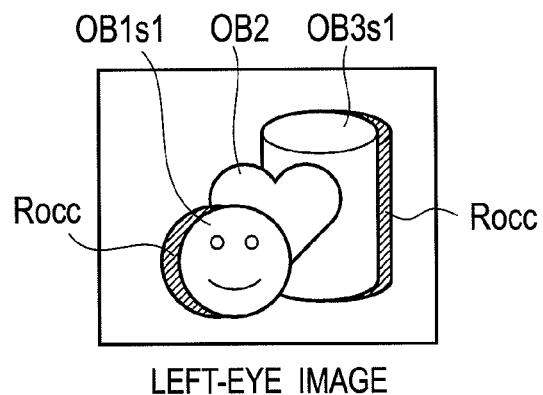

By using FIG. 9 and FIGS. 30A and 30B, a description is made of a generation method of the shifted image in the left-eye shifted image generation unit 1546. As mentioned above, FIG. 9 is an example of the inputted stereo image pair, the object OB1 has a parallax in the protruding direction, the object OB2 has no parallax, and the object OB3 has a parallax in the depth direction. FIG. 30A shows an example of the parallax values to be indicated by the already-adjusted left-eye pseudo stereoscopic parallax value DPT_L_Gn. Here, for simplification, it is assumed that the parallax values are uniform in the respective objects OB1 to OB3, and that the parallax values are 20 in the object OB1, zero in the object OB2, and −20 in the object OB3.

The left-eye shifted image generation unit 1546 sets half values of the respective parallax values as the amounts of pixel shift, shifts the pixels of the objects in the right direction when the values are positive, and shifts the pixels of the objects in the left direction when the values are negative. FIG. 30B shows a left-eye shifted image. The object OB1 is shifted by 10 pixels in the right direction, and becomes an object OB1s1, and the object OB3 is shifted by 10 pixels in the left direction, and becomes an object OB3s1. The objects OB1 and OB3 are shifted, whereby difference portions between the objects OB1 and OB1s1 and between the objects OB3 and OB3s1 become occlusion regions Rocc where the correct pixels of the objects are not present. The left-eye shifted image generation unit 1546 interpolates pixels in the occlusion regions Rocc by using information of pixels, which are closest to the pixels concerned among pixels, which are present in the horizontal right-and-left direction and are correctly sifted.

In a similar way to the left-eye pseudo irregularity parallax generation unit 1542, the right-eye pseudo irregularity parallax generation unit 1543 estimates irregularity information of the objects in the image in the unit of pixel, based on the feature of the inputted right-eye image signal, and outputs the estimated irregularity information as a right-eye pseudo irregularity parallax value DPT_EMBS_R. The right-eye pseudo irregularity parallax generation unit 1543 calculates the right-eye pseudo irregularity parallax value DPT_EMBS_R by using Expression (9). Reference symbol R_RIGHT in Expression (9) denotes an R signal of the right-eye image signal. Also here, the signal for use is not limited to the R signal, and there may be used a G signal or a B signal, or a combination of any of the R, G and B signals, and further, a brightness signal.

$$DPT\_EMBS\_R = R\_RIGHT - 128 \qquad (9)$$

The right-eye pseudo irregularity parallax generation unit 1543 is a parallax generation unit that, based on a color component or brightness component of the right-eye image signal, generates parallax value data indicating the pseudo parallax value to be given to the right-eye image signal.

In a similar way to the left-eye parallax adjustment unit 1544, the right-eye parallax adjustment unit 1545 synthesizes the basic depth model parallax value DPT_MDL, which is outputted from the basic depth model parallax generation unit 1541, and the right-eye pseudo irregularity parallax value DPT_EMBS_R, which is outputted from the right-eye pseudo irregularity parallax generation unit 1543, with each other while adjusting gains thereof, and generates the already-adjusted right-eye pseudo stereoscopic parallax value DPT_R_Gn. Based on Expression (10), the right-eye parallax adjustment unit 1545 synthesizes the basic depth model parallax value DPT_MDL and the right-eye pseudo irregularity parallax value DPT_EMBS_R with each other.

$$DPT\_R\_Gn = DPT\_MDL \times Gf + DPT\_EMBS\_R \times Gk \qquad (10)$$

In a similar way also in the right-eye parallax adjustment unit 1545, when the back-and-forth vision between the objects in the image by the inputted stereo image pair (3D video signal) is poor, the basic depth model parallax value DPT_MDL is emphasized, and when the irregularity vision (stereoscopic vision) of each of the objects themselves in the image by the stereo image pair is poor, the right-eye pseudo irregularity parallax value DPT_EMBS_R is emphasized.

Based on the already-adjusted right-eye pseudo stereoscopic parallax value DPT_R_Gn outputted from the right-eye parallax adjustment unit 1545, the right-eye shifted image generation unit 1547 shifts the pixel of the right-eye image signal, and generates the right-eye shifted image. The right-eye shifted image is outputted as a right-eye image signal in which the parallax is adjusted.

Figure 31A:
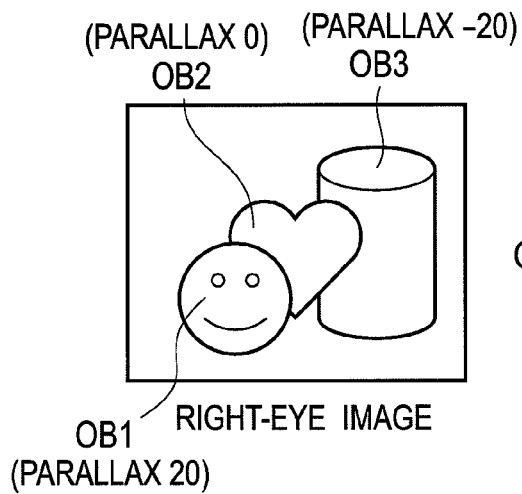
FIGS. 31A and 31B are views for explaining operations of a right-eye shifted image generation unit 1547 in FIG. 24.
Figure 31B:
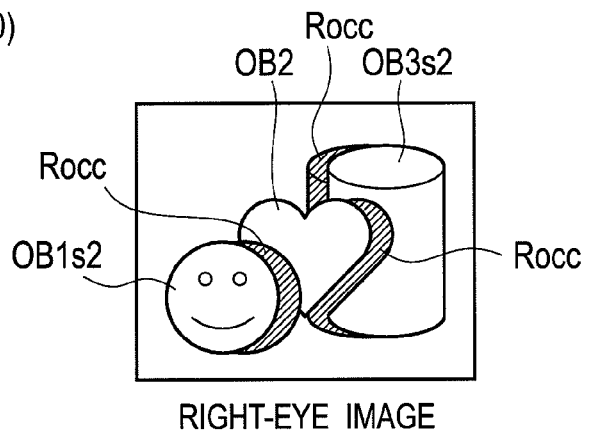

FIG. 31A shows examples of the parallax values to be indicated by the already-adjusted right-eye pseudo stereoscopic parallax value DPT_R_Gn, and the parallax values are 20 in the object OB1, zero in the object OB2, and −20 in the object OB3. The right-eye shifted image generation unit 1547 sets half values of the respective parallax values as the amounts of pixel shift, shifts the pixels of the objects in the left direction when the values are positive, and shifts the pixels of the objects in the right direction when the values are negative. FIG. 31B shows a right-eye shifted image. The object OB1 is shifted by 10 pixels in the left direction, and becomes an object OB1s2, and the object OB3 is shifted by 10 pixels in the right direction, and becomes an object OB3s2.

The objects OB1 and OB3 are shifted, whereby difference portions between the objects OB1 and OB1s2 and between the objects OB3 and OB3s2 become occlusion regions Rocc where the correct pixels of the objects are not present. In FIG. 31B, by the fact that the object OB3 is shifted in the right direction, the pixels of the object OB3 come not to be present in a region where the object OB2 and the object OB3 have overlapped each other in the original image of FIG. 31A, and this portion also becomes an occlusion region Rocc. The right-eye shifted image generation unit 1547 interpolates pixels in the occlusion regions Rocc by using information of pixels, which are closest to the pixels concerned among pixels, which are present in the horizontal right-and-left direction and are correctly sifted.

As described above, the left-eye image signal and the right-eye image signal, which compose the stereo image pair outputted from the stereoscopic image generation apparatus 104, are supplied to the stereo display device 3, and the 3D image is displayed.

Figure 32A:
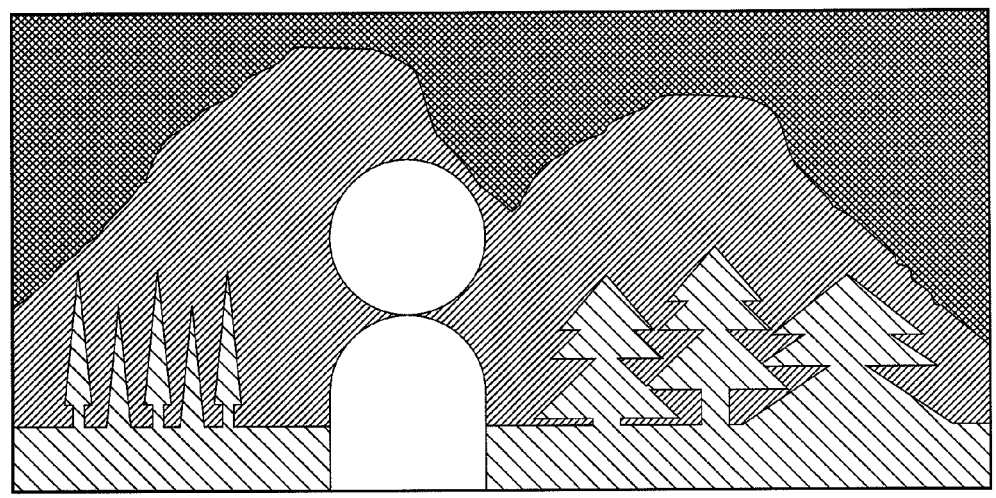
FIGS. 32A-32C are views for explaining effects according to the fourth embodiment.

By using FIGS. 32A-31C, a description is made of effects by this embodiment. FIG. 32A conceptually shows the parallax values of the respective objects of the image of FIG. 21. As shown in FIG. 32C, a value when the parallax is zero is set at 128, a maximum parallax in the depth direction is set at zero, and a maximum parallax in the protruding direction is set at 255, and each parallax is expressed by a monochrome tone that ranges from zero to 255. In FIG. FIGS. 32A-31C, such monochrome tones are expressed by differentiating hatching. As shown in FIG. 21, in the case where a distant view and a person are simultaneously shown up, if this embodiment is not used, then as shown in FIG. 32A, though the parallax differences among the objects are expressed, the stereoscopic vision of each of the objects themselves is poor since the parallax difference in the object becomes a smaller value in comparison with the parallax differences among the objects, and the respective objects look flat. That is to say, it is visually recognized that the cardboard phenomenon has occurred.

Figure 32B:
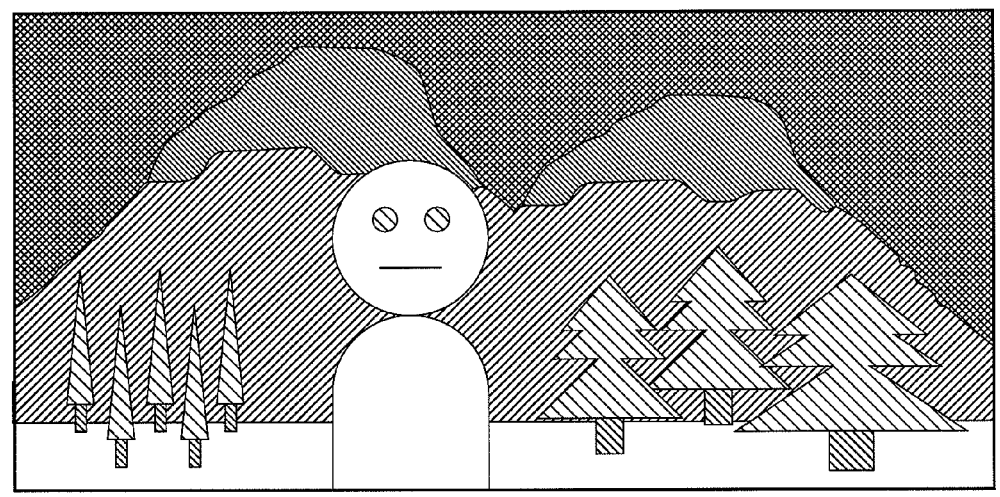
Figure 32C:
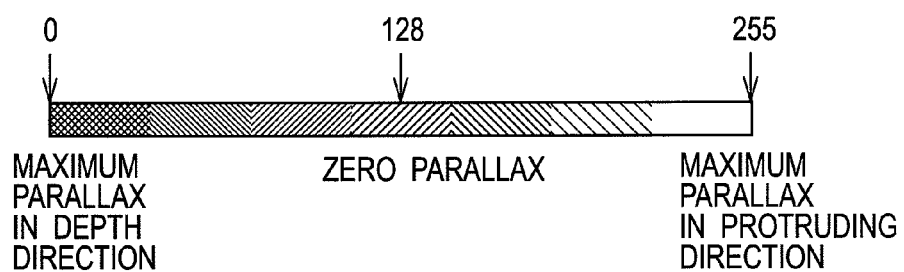

FIG. 32B conceptually shows the parallax values of the respective objects according to this embodiment. As understood from comparison between FIG. 32A and FIG. 32B, a parallax difference is given between trunk portions and leaf portions in the trees TR in FIG. 32B, and the stereoscopic vision of the trees TR is expressed. In a similar way, the sky SK and the mount MT are also expressed while being given parallax differences. In a similar way, the person PN is also given a parallax difference, and stereoscopic vision of the face is expressed. Though not expressed in FIG. 32B, in actual, for example, insides of the trees and insides of the leaves in the trees TR are also expressed while being given parallax differences. That is to say, the cardboard phenomenon is reduced.

For example, in the case of such a composition as obtained by imaging only a distant view, the stereoscopic degree F. to be determined by the stereoscopic degree determination unit 14 becomes relatively low. Hence, the gain Gf with respect to the basic depth model parallax value DPT_MDL in Expression (8) and Expression (10) becomes a relatively large value, and the stereoscopic vision is improved.

In the case of such a composition as obtained by imaging the person on the distant view taken as a background, which is as shown in FIG. 21, the stereoscopic degree F. to be determined by the stereoscopic degree determination unit 14 becomes relatively high. Hence, the gain Gf with respect to the basic depth model parallax value DPT_MDL in Expression (8) and Expression (10) becomes a relatively small value, and the improvement of the stereoscopic vision by the gain Gf becomes slight. Meanwhile, the cardboard degree K to be determined by the cardboard degree determination unit 16 becomes relatively high. Hence, Gk with respect to the left-eye pseudo irregularity parallax value DPT_EMBS_L and the right-eye pseudo irregularity parallax value DPT_EMBS_R in Expression (8) and Expression (10) becomes relatively high, and the cardboard phenomenon is reduced.

In accordance with the embodiment described above, the stereoscopic image with the stereoscopic vision can be generated even in accordance with the 3D video signal poor in stereoscopic vision.

The present invention is not limited to the embodiments described above, and is changeable in various ways within the scope without changing the spirit of the present invention. In the image signal conversion unit 1540, the amount of pixel shift of only one of the left-eye image signal and the right-eye image signal may be obtained, and a shifted image in which the parallax is adjusted for only one of the left-eye image signal and the right-eye image signal may be formed.

Moreover, in the embodiments, the two-view video signal is taken as a target, and the pixels are shifted, whereby the stereoscopic vision of each of the objects in such a composition in which the cardboard phenomenon occurs is improved. However, pixels of an arbitrary-plural-view video signal are shifted, whereby it is possible to improve the stereoscopic vision of each of the objects in a similar way. That is to say, the stereoscopic image generation apparatus and stereoscopic image generation method of the present invention are not limited to the case of taking the two-view video signal as a target, and can take, as a target, a multi-view video signal, which is a three-view video signal or more.

The present invention can be applied to an arbitrary electronic instrument that handles the 3D video signal composed of two views or plural views which are three views or more. The configuration of the present invention may be provided in a recording apparatus that records the 3D video signal, or the configuration of the present invention may be provided in a display apparatus that displays the 3d video signal. The configuration of the present invention can be utilized in the event of improving the stereoscopic vision of the 3D contents in the arbitrary electronic instrument.

What is claimed is:

1. A stereoscopic image generation apparatus comprising:
   a parallax value detection unit configured to detect a parallax value between a left-eye image signal and a right-eye image signal in a stereoscopic video signal;
   a stereoscopic degree determination unit configured to determine a stereoscopic degree of the stereoscopic video signal based on the parallax value detected by the parallax value detection unit;
   a cardboard degree determination unit configured to, based on the parallax value detected by the parallax value detection unit, determine a cardboard degree indicating an extent to which a cardboard phenomenon occurs in an object included in the stereoscopic video signal; and
   an image signal conversion unit configured to, in response to the stereoscopic degree and the cardboard degree, obtain an amount of pixel shift, by which a pixel of at least one signal of the left-eye image signal and the right-eye image signal is to be shifted, and shift the pixel of the left-eye image signal or the right-eye image signal by the amount of pixel shift.

2. The stereoscopic image generation apparatus according to claim 1,
   wherein the image signal conversion unit includes:
   a first parallax generation unit configured to generate first parallax value data indicating a parallax value representing a stereoscopic shape of a whole of a frame, the parallax value being to be set in response to a composition of an image by the stereoscopic video signal;
   a second parallax generation unit configured to generate second parallax value data indicating a pseudo parallax value, the pseudo parallax value being to be given to the left-eye image signal or the right-eye image signal, based on at least one component among a color component of the left-eye image signal, a color component of the right-eye image signal, a brightness component of the left-eye image signal, and a brightness component of the right-eye image signal; and
   a parallax adjustment unit configured to, in response to the stereoscopic degree and the cardboard degree, synthesize the first parallax value data and the second parallax value data with each other, and generate the amount of pixel shift for the left-eye image signal or the right-eye image signal.

3. The stereoscopic image generation apparatus according to claim 2, wherein the first parallax generation unit has a plurality of basic depth models for deciding the parallax value of the whole of the frame, and in response to the composition of the image by the stereoscopic video signal, generates the first parallax value data by selecting one from the plurality of basic depth models, or generates the first parallax value data by selecting plural pieces from the plurality of basic depth models and synthesizing the plural pieces with one another.

4. The stereoscopic image generation apparatus according to claim 2,
   wherein the parallax adjustment unit generates the amount of pixel shift by adding a value, which is obtained by multiplying the first parallax value data by a first gain, and a value, which is obtained by multiplying the second parallax value data by a second gain, to each other, and reduces the first gain as the stereoscopic degree is larger, and increases the second gain as the cardboard degree is larger.

5. The stereoscopic image generation apparatus according to claim 1,
   wherein the cardboard degree determination unit includes:
   a histogram detection unit configured to detect a histogram of the parallax value detected by the parallax value detection unit;
   a histogram width detection unit configured to, based on the histogram, obtain a width of a histogram of the object included in the image by the stereoscopic video signal; and
   a threshold value comparison unit configured to generate the cardboard degree by comparing the width of the histogram and a predetermined threshold value with each other.

6. The stereoscopic image generation apparatus according to claim 5, wherein the histogram width detection unit obtains a width of a histogram of an object having a maximum histogram value among a plurality of the objects included in the image by the stereoscopic video signal.

7. A stereoscopic image generation apparatus comprising:
   a parallax value detection unit configured to detect a parallax value between a left-eye image signal and a right-eye image signal in a stereoscopic video signal;
   a stereoscopic degree determination unit configured to determine a stereoscopic degree of the stereoscopic video signal based on the parallax value detected by the parallax value detection unit; and an image signal conversion unit configured to, in response to the stereoscopic degree, obtain an amount of pixel shift, by which a pixel of at least one signal of the left-eye image signal and the right-eye image signal is to be shifted, and shift the pixel of the left-eye image signal or the right-eye image signal by the amount of pixel shift, wherein the image signal conversion unit includes:

a pseudo stereoscopic parallax estimation unit configured to obtain a pseudo stereoscopic parallax value while taking, as a reference, one signal of the left-eye image signal and the right-eye image signal;

a pseudo stereoscopic parallax synthesis unit configured to, in response to the stereoscopic degree, synthesize the pseudo stereoscopic parallax value and the parallax value with each other and generate a synthetic parallax value; and a shifted image generation unit configured to shift the pixel of the left-eye image signal or the right-eye image signal by the synthetic parallax value taken as the amount of pixel shift.

8. A stereoscopic image generation method comprising:

a parallax value detection step of detecting a parallax value between a left-eye image signal and a right-eye image signal in a stereoscopic video signal;

a stereoscopic degree determination step of determining a stereoscopic degree of the stereoscopic video signal based on the parallax value detected in the parallax value detection step;

a cardboard degree determination step of determining, based on the parallax value detected in the parallax value detection step, a cardboard degree indicating an extent to which a cardboard phenomenon occurs in an object included in the stereoscopic video signal;

an amount-of-pixel-shift generation step of obtaining, in response to the stereoscopic degree and the cardboard degree, an amount of pixel shift, by which a pixel of at least one signal of the left-eye image signal and the right-eye image signal is to be shifted; and an image signal conversion step of shifting the pixel of the left-eye image signal or the right-eye image signal by the amount of pixel shift, the amount being generated in the amount-of-pixel-shift generation step.

9. The stereoscopic image generation method according to claim 8, further comprising:

a first parallax generation step of generating first parallax value data indicating a parallax value representing a parallax value of a whole of a frame, the parallax value being to be set in response to a composition of an image by the stereoscopic video signal; and a second parallax generation step of generating second parallax value data indicating a pseudo parallax value, the pseudo parallax value being to be given to the left-eye image signal or the right-eye image signal, based on at least one component among a color component of the left-eye image signal, a color component of the right-eye image signal, a brightness component of the left-eye image signal, and a brightness component of the right-eye image signal, wherein, in response to the stereoscopic degree and the cardboard degree, the amount-of-pixel-shift generation step includes a step of synthesizing the first parallax value data and the second parallax value data with each other, and generating the amount of pixel shift for the left-eye image signal or the right-eye image signal.

10. The stereoscopic image generation method according to claim 9, wherein, in response to the composition of the image by the stereoscopic video signal, the first parallax generation step includes a step of generating the first parallax value data by selecting one from a plurality of basic depth models for deciding the parallax value of the whole of the frame, or generating the first parallax value data by selecting plural pieces from the plurality of basic depth models and synthesizing the plural pieces with one another.

11. The stereoscopic image generation method according to claim 9, wherein the amount-of-pixel-shift generation step includes a step of generating the amount of pixel shift by adding a value, which is obtained by multiplying the first parallax value data by a first gain, and a value, which is obtained by multiplying the second parallax value data by a second gain, to each other, and reducing the first gain as the stereoscopic degree is larger, and increases the second gain as the cardboard degree is larger.

12. The stereoscopic image generation method according to claim 8, wherein the cardboard degree determination step includes:

a histogram detection step of detecting a histogram of the parallax value detected in the parallax value detection step;

a histogram width detection step of obtaining, based on the histogram, a width of a histogram of the object included in the image by the stereoscopic video signal; and a cardboard degree generation step of generating the cardboard degree by comparing the width of the histogram and a predetermined threshold value with each other.

13. The stereoscopic image generation method according to claim 12, wherein the histogram width detection step includes a step of obtaining a width of a histogram of an object having a maximum histogram value among a plurality of the objects included in the image by the stereoscopic video signal.

* * * * *